United States Patent
Zheng et al.

(10) Patent No.: US 10,559,861 B2
(45) Date of Patent: Feb. 11, 2020

(54) BATTERY MANAGEMENT METHOD, BATTERY, FLIGHT CONTROL SYSTEM AND UNMANNED AERIAL VEHICLE

(71) Applicant: SZ DJI TECHNOLOGY CO., LTD., Shenzhen (CN)

(72) Inventors: Dayang Zheng, Shenzhen (CN); Juncheng Zhan, Shenzhen (CN); Lei Wang, Shenzhen (CN); Wentao Wang, Shenzhen (CN); Baigao Xu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 35 days.

(21) Appl. No.: 15/858,869

(22) Filed: Dec. 29, 2017

(65) Prior Publication Data
US 2018/0145377 A1 May 24, 2018

Related U.S. Application Data

(63) Continuation of application No. PCT/CN2015/082861, filed on Jun. 30, 2015.

(51) Int. Cl.
*H02J 7/00* (2006.01)
*H01M 10/42* (2006.01)
(Continued)

(52) U.S. Cl.
CPC ....... *H01M 10/4264* (2013.01); *B64C 39/024* (2013.01); *G05D 1/0088* (2013.01);
(Continued)

(58) Field of Classification Search
CPC .. H01M 10/4264; H01M 10/48; H02J 7/0031; H02J 2007/004; H02J 2007/0037; Y02E 60/12
See application file for complete search history.

(56) References Cited

U.S. PATENT DOCUMENTS

| | | | |
|---|---|---|---|
| 2010/0121511 A1* | 5/2010 | Onnerud | H02J 7/0014 701/22 |
| 2010/0121587 A1 | 5/2010 | Vian et al. | |
| 2016/0054393 A1* | 2/2016 | Hase | B60L 3/0084 324/434 |

FOREIGN PATENT DOCUMENTS

| | | |
|---|---|---|
| CN | 102624050 A | 8/2012 |
| CN | 103166285 A | 6/2013 |

(Continued)

OTHER PUBLICATIONS

The World Intellectual Property Organization (WIPO) International Search Report for PCT/CN2015/082861 dated Mar. 31, 2016 6 pages (including translation).

*Primary Examiner* — Arun C Williams
(74) *Attorney, Agent, or Firm* — Anova Law Group, PLLC

(57) ABSTRACT

A battery includes a first cell unit, a first control circuit electrically connected with the first cell unit, a second cell unit connected with the first cell unit in parallel, and a second control circuit electrically connected with the second cell unit. The first control circuit is configured to disconnect an electrical connection between the first cell unit and a power output terminal of the first control circuit in response to a failure of the first cell unit. The second control circuit is configured to disconnect an electrical connection between the second cell unit and a power output terminal of the second control circuit in response to a failure of the second cell unit.

18 Claims, 14 Drawing Sheets

(51) Int. Cl.
*B64C 39/02* (2006.01)
*G05D 1/00* (2006.01)
*G05D 1/10* (2006.01)

(52) U.S. Cl.
CPC ............ *G05D 1/101* (2013.01); *H02J 7/0021* (2013.01); *B64C 2201/14* (2013.01); *H01M 2010/4271* (2013.01)

(56) References Cited

FOREIGN PATENT DOCUMENTS

| | | |
|---|---|---|
| CN | 203536986 U | 4/2014 |
| CN | 203690968 U | 7/2014 |
| CN | 104009512 A | 8/2014 |
| CN | 204928331 U | 12/2015 |

* cited by examiner

BATTERY MANAGEMENT METHOD, BATTERY, FLIGHT CONTROL SYSTEM AND UNMANNED AERIAL VEHICLE

CROSS-REFERENCE TO RELATED APPLICATION

This is a continuation application of International Application No. PCT/CN2015/082861, filed on Jun. 30, 2015, the entire contents of which are incorporated herein by reference.

TECHNICAL FIELD

The disclosure relates to battery management, and more particularly to a battery management method, a battery, a flight control system and an unmanned aerial vehicle.

BACKGROUND

With continuous development in electronics technology, unmanned aerial vehicles (UAVs) have been widely used in daily life. A battery is a power source for UAVs as it is lightweight, compact and stable in discharging. A battery of UAV comprises multiple cells. Any over-voltage, under-voltage, over-current or over-temperature in one or more of the cells can damage a composition material of the cell or even lead to an explosion of the battery.

A battery management system (BMS) is provided to ensure a safe operation of the battery. The BMS can collect information of cells in the battery including a voltage, a current or a temperature. The BMS can be configured to disconnect an electrical connection between the battery and an external device using a protection circuit board if a failure such as an over-current or an over-temperature is detected in the battery. An operation of the battery can be immediately terminated to prevent an over-voltage, an under-voltage, an overcurrent, a short-circuit or an over-temperature, thereby ensuring a safety of the battery.

In conventional technologies, a UAV carries only one battery in view of a limited payload capacity, and that one battery may account for half or even two thirds of the payload capacity. A power circuit of the UAV may be switched off upon a failure in the battery. As a result, the UAV may crash due to a loss of power in flight, leading to a safety risk.

A UAV may carry multiple batteries as backup batteries to extend a flight range. A backup battery can be used to power the UAV if a primary battery fails, such that a crash of UAV due to a loss of power can be prevented. However, a payload capacity of the UAV may be reduced as multiple batteries are carried onboard the UAV.

SUMMARY

The present disclosure provides a battery management method, a battery, a flight control system and an unmanned aerial vehicle to improve a safety of the unmanned aerial vehicle without reducing a payload capacity.

In accordance with the disclosure, there is provided a battery including a first cell unit, a first control circuit electrically connected with the first cell unit, a second cell unit connected with the first cell unit in parallel, and a second control circuit electrically connected with the second cell unit. The first control circuit is configured to disconnect an electrical connection between the first cell unit and a power output terminal of the first control circuit in response to a failure of the first cell unit. The second control circuit is configured to disconnect an electrical connection between the second cell unit and a power output terminal of the second control circuit in response to a failure of the second cell unit.

Also in accordance with the disclosure, there is provided a method for managing a battery including a first cell unit and a second cell unit connected in parallel. The method includes detecting whether the first cell unit or the second cell unit fails, directing the first cell unit to terminate discharging or charging in response to a failure of the first cell unit, and directing the second cell unit to terminate discharging or charging in response to a failure of the second cell unit.

Also in accordance with the disclosure, there is provided an unmanned aerial vehicle including a propulsion device configured to provide a propulsion and a battery configured to provide an electric power to the propulsion device. The battery includes a first cell unit, a first control circuit electrically connected with the first cell unit, a second cell unit connected with the first cell unit in parallel, and a second control circuit electrically connected with the second cell unit. The first control circuit is configured to disconnect an electrical connection between the first cell unit and a power output terminal of the first control circuit in response to a failure of the first cell unit. The second control circuit is configured to disconnect an electrical connection between the second cell unit and a power output terminal of the second control circuit in response to a failure of the second cell unit.

DETAILED DESCRIPTION OF THE EMBODIMENTS

Technical solutions of the present disclosure will be described with reference to the drawings. It will be appreciated that embodiments as described in the disclosure are some rather than all of the embodiments of the present disclosure. Other embodiments, which are conceived by those having ordinary skills in the art on the basis of the disclosed embodiments without inventive efforts, should fall within the scope of the present disclosure.

Figure 1:
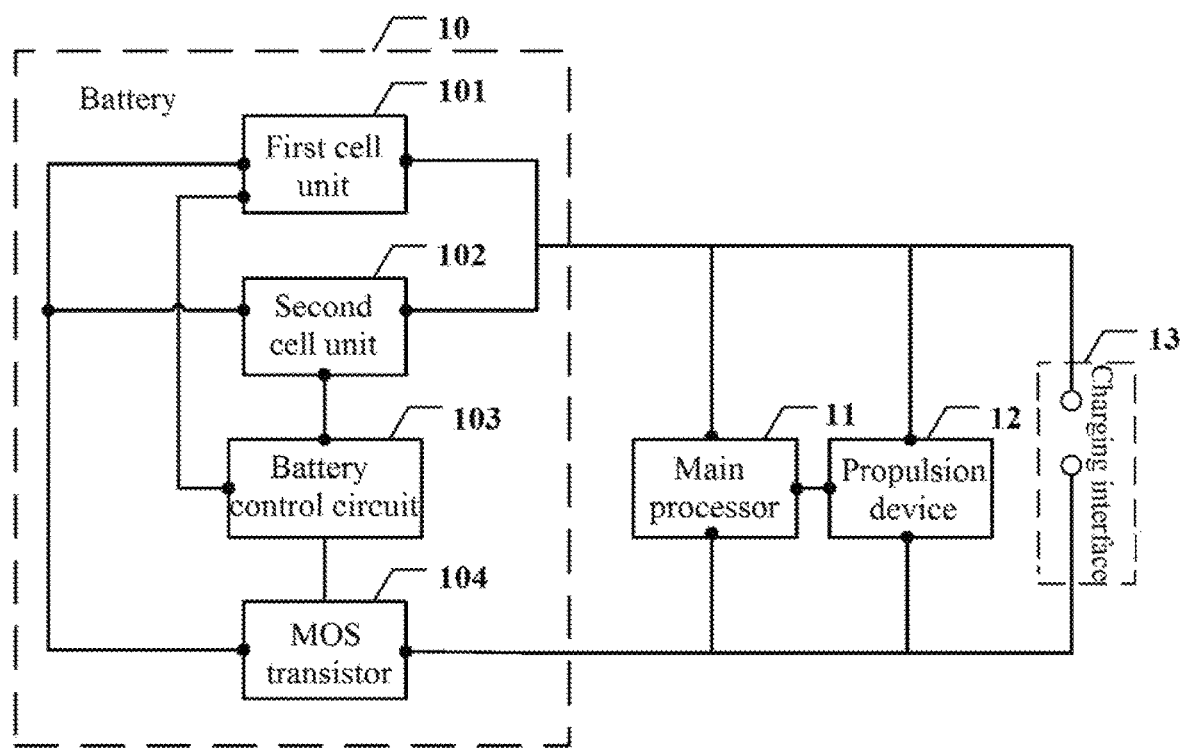
FIG. 1 is a schematic diagram of a conventional unmanned aerial vehicle (UAV)

FIG. 1 shows a block diagram of a conventional unmanned aerial vehicle (UAV), which comprises a battery 10, a main processor 11, a propulsion device 12, and charging interface 13. In some instances, the battery 10 comprises a first cell unit 101, a second cell unit 102, and a battery control circuit 103.

The battery 10 can provide power to the main processor 11 and the propulsion device 12. Charging device (not shown) can charge the battery 10 through charging interface 13.

If the first cell unit 101 or the second cell unit 102 fails, the battery control circuit 103 can detect the failure and immediately turn off a metal-oxide-semiconductor (MOS) transistor 104 to ensure a safety of the battery. As a result, an operation of the main processor 11 and the propulsion device 12 is terminated due to a power loss, and the UAV may crash if it is in flight.

Figure 2:
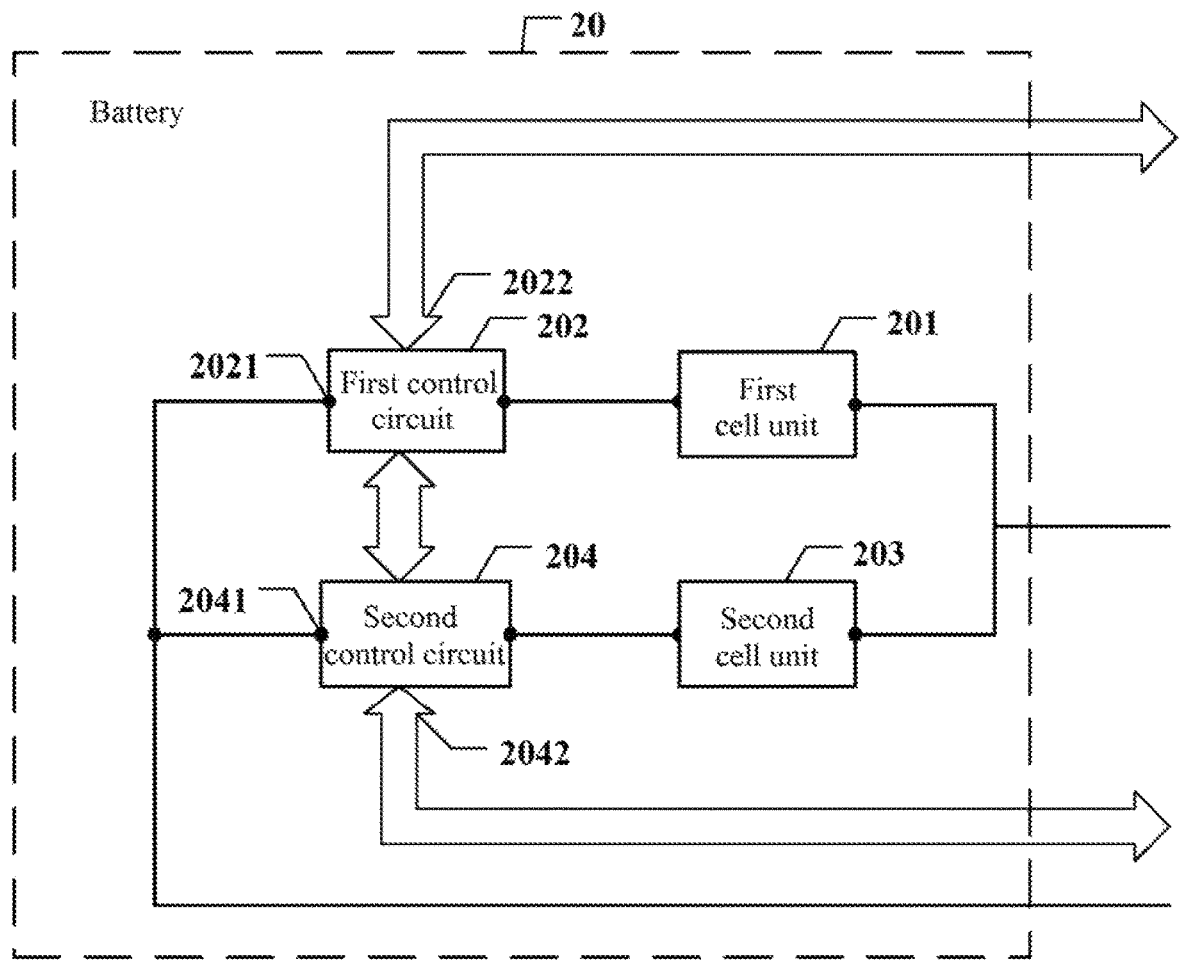
FIG. 2 is a schematic diagram of a battery in accordance with an embodiment of the disclosure.

The disclosure provides an improved technical solution where the main processor 11 and the propulsion device 12 can operate even if the first cell unit 101 or the second cell unit 102 fails. FIG. 2 shows a block diagram of an example battery 20 in accordance with embodiments of the disclosure. As shown in FIG. 2, the battery 20 comprises a first cell unit 201, a first control circuit 202, a second cell unit 203, and a second control circuit 204. The first control circuit 202 is electrically connected with the first cell unit 201. The first control circuit 202 can be configured to monitor a failure of the first cell unit 201 and disconnect an electrical connection between the first cell unit 201 and a power output terminal 2021 of the first control circuit 202 if the first cell unit 201 fails, such that a discharging or charging of the first cell unit 201 is terminated. The second control circuit 204 is electrically connected with the second cell unit 203. The second control circuit 204 can be configured to monitor a failure of the second cell unit 203 and disconnect an electrical connection between the second cell unit 203 and a power output terminal 2041 of the second control circuit 204 if the second cell unit 203 fails, such that a discharging or charging of the second cell unit 203 is terminated. The first cell unit 201 and the second cell unit 203 can be connected in parallel. Each of the first cell unit 201 and the second cell unit 203 can comprise at least one cell.

In some embodiments, the battery 20 can comprise more than two cell units, each of which is electrically connected to a respective control circuit. In the embodiments that the battery 20 comprises more than two cell units, two or more than two cell units may fail. As long as not all of the cell units of the battery fail, a non-failed cell unit can still power an external device, such that the device being powered can continue its operation at a low electric energy state. The failed cell units can be activated if an activation condition is satisfied. In some embodiments, the battery 20 can be a lithium battery.

In some embodiments, the number of cells in the first cell unit 201 can be identical to the number of cells in the second cell unit 203. In some other embodiments, the number of cells in the first cell unit 201 is different from the number of cells in the second cell unit 203. In these embodiments, a switch power supply DC/DC converter can be provided to the first control circuit 202 or the second control circuit 204.

The DC/DC converter can convert an input voltage into a preset output voltage, such that voltages at various branch circuits can be balanced.

In some embodiments of the disclosure, as shown in FIG. 2, the first control circuit 202 comprises a first signal output terminal 2022 through which a signal indicating a failure in the first cell unit 201 can be transmitted if the first cell unit 201 fails. In some embodiments of the disclosure, a communication transmission through the signal output 2022 can be terminated if the first cell unit 201 fails.

In some embodiments of the disclosure, as shown in FIG. 2, the second control circuit 204 comprises a second signal output terminal 2042 through which a signal indicating a failure in the second cell unit 203 can be transmitted if the second cell unit 203 fails. In some embodiments of the disclosure, a communication transmission through the signal output 2042 can be terminated if the second cell unit 203 fails.

In some embodiments of the disclosure, the second control circuit 204 can communicate with the first control circuit 202.

In some embodiments of the disclosure, the first control circuit 202 can transmit a signal indicating a failure in the second cell unit 203 or the second control circuit 204 if the second cell unit 203 or the second control circuit 204 fails.

In some embodiments, the first control circuit 202 can transmit to an external device a signal indicating a failure in the second cell unit 203 if the second cell unit 203 fails. Further, the first control circuit 202 can transmit to an external device a signal indicating a failure in the second control circuit 204 if the second control circuit 204 fails.

In some embodiments of the disclosure, the second control circuit 204 can transmit a signal indicating a failure in the first cell unit 201 and/or the first control circuit 202 if the first cell unit 201 and/or the first control circuit 202 fail.

In some embodiments, the second control circuit 204 can transmit to an external device a signal indicating a failure in the first cell unit 201 if the first cell unit 201 fails. Further, the second control circuit 204 can transmit to an external device a signal indicating a failure in the first control circuit 202 if the first control circuit 202 fails. The second control circuit 204 can transmit a signal indicating a failure in the first cell unit 201 and the first control circuit 202 if the first cell unit 201 and the first control circuit 202 both fail.

Figure 3:
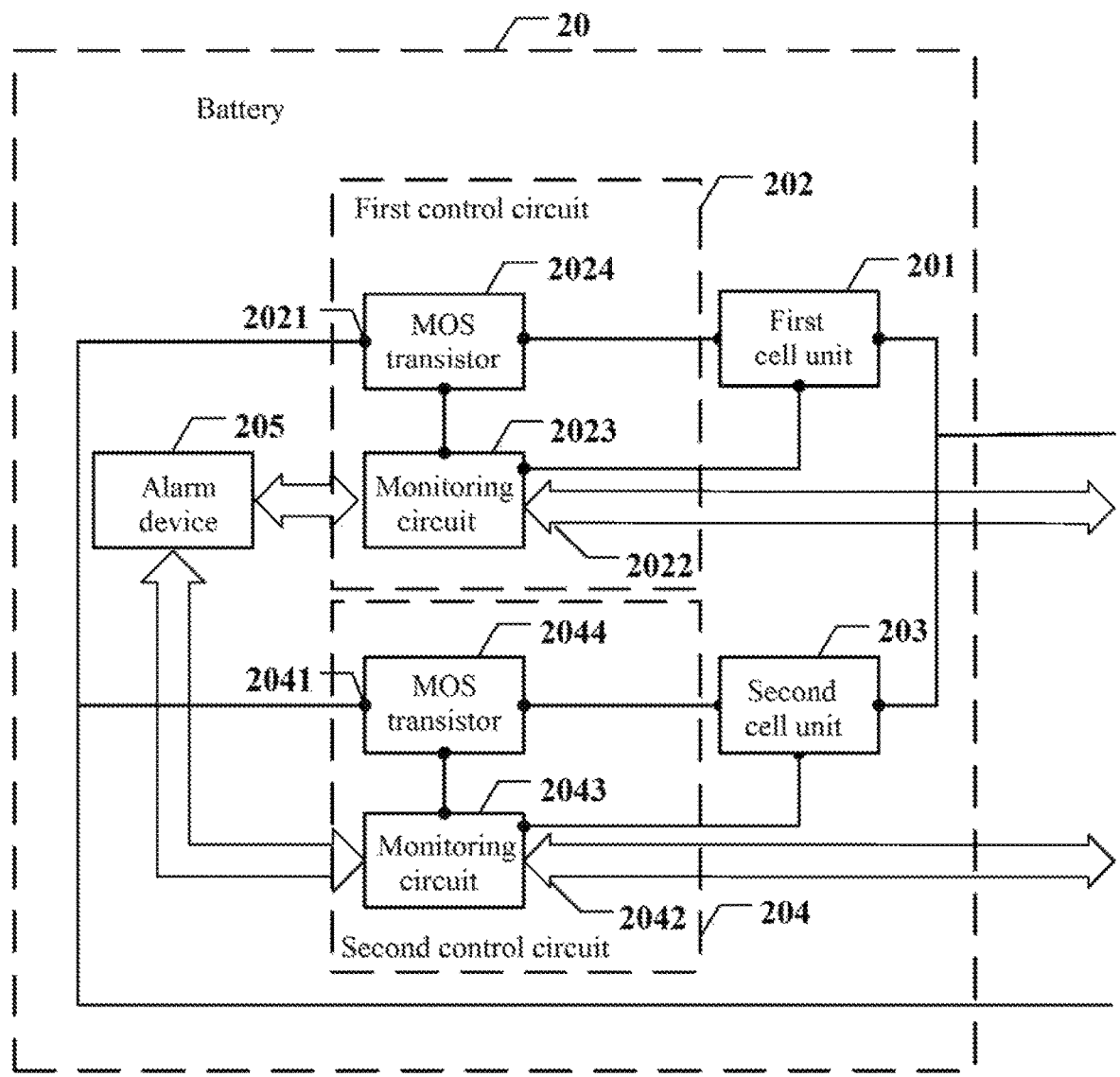
FIG. 3 is another schematic diagram of a battery in accordance with an embodiment of the disclosure.

FIG. 3 shows the battery 20 in accordance with another embodiment of the disclosure. As shown in FIG. 3, the first control circuit 202 comprises a monitoring circuit 2023 and a MOS transistor 2024. The monitoring circuit 2023 can output a control signal to the MOS transistor 2024 if the first cell unit 201 fails. The MOS transistor 2024 can disconnect an electrical connection between the first cell unit 201 and the power output terminal 2021 of the first control circuit 202 based upon the control signal.

In some embodiments of the disclosure, the first control circuit 202 can be configured to detect whether a current of the first cell unit 201 exceeds a first current threshold. A determination that the first cell unit 201 fails can be made if the current of the first cell unit 201 exceeds the first current threshold.

In some embodiments of the disclosure, the first control circuit 202 can be configured to detect whether a voltage of at least one cell in the first cell unit 201 exceeds a first voltage threshold. A determination that the first cell unit 201 fails can be made if the voltage of the at least one cell in the first cell unit 201 exceeds the first voltage threshold.

In some embodiments of the disclosure, the first control circuit 202 can be configured to detect whether a voltage of at least one cell in the first cell unit 201 is below a second voltage threshold. A determination that the first cell unit 201 fails can be made if the voltage of the at least one cell in the first cell unit 201 is below the second voltage threshold.

In some embodiments of the disclosure, the first control circuit 202 can be configured to detect whether a temperature of at least one cell in the first cell unit 201 is within a first preset temperature range. A determination that the first cell unit 201 fails can be made if the temperature of the at least one cell in the first cell unit 201 is outside the first preset temperature range.

In some embodiments of the disclosure, as shown in FIG. 3, the second control circuit 204 comprises a monitoring circuit 2043 and a MOS transistor 2044. The monitoring circuit 2041 can output a control signal to the MOS transistor 2044 if the second cell unit 203 fails. The MOS transistor 2042 can disconnect an electrical connection between the second cell unit 203 and the power output terminal 2041 of the second control circuit 204 based upon the control signal.

In some embodiments of the disclosure, the second control circuit 204 can be configured to detect whether a current of the second cell unit 203 exceeds a second current threshold. A determination that the second cell unit 203 fails can be made if the current of the second cell unit 203 exceeds the second current threshold.

In some embodiments of the disclosure, the second control circuit 204 can be configured to detect whether a voltage of at least one cell in the second cell unit 203 exceeds a third voltage threshold. A determination that the second cell unit 203 fails can be made if the voltage of the at least one cell in the second cell unit 203 exceeds the third voltage threshold.

In some embodiments of the disclosure, the second control circuit 204 can be configured to detect whether a voltage of at least one cell in the second cell unit 203 is below a fourth voltage threshold. A determination that the second cell unit 203 fails can be made if the voltage of the at least one cell in the second cell unit 203 is below the fourth voltage threshold.

In some embodiments of the disclosure, the second control circuit 204 can be configured to detect whether a temperature of at least one cell in the second cell unit 203 is within a second preset temperature range. A determination that the second cell unit 203 fails can be made if the temperature of the at least one cell in the second cell unit 203 is outside the second preset temperature range.

In some embodiments of the disclosure, as shown in FIG. 3, the battery 20 further comprises an alarm device 205. The first control circuit 202 and the second control circuit 204 are both in communication connection with the alarm device 205. The alarm device 205 can generate an alarm if the first cell unit 201 and/or the second cell unit 203 fails.

In some embodiments of the disclosure, the first control circuit 202 can direct the alarm device 205 to generate an alarm if the first cell unit 201 fails.

In some embodiments of the disclosure, the second control circuit 204 can direct the alarm device 205 to generate an alarm if the second cell unit 203 fails.

In some instances, the first control circuit 202 and the second control circuit 204 can both direct the alarm device 205 to generate an alarm if the first cell unit 201 and the second cell unit 203 both fail.

In some embodiments of the disclosure, the first control circuit 202 and the second control circuit 204 can communicate with each other. The first control circuit 202 can direct the alarm device 205 to generate an alarm if the second cell unit 203 and/or the second control circuit 204 fails.

In some embodiments of the disclosure, the first control circuit 202 and the second control circuit 204 can communicate with each other. The second control circuit 204 can direct the alarm device 205 to generate an alarm if the first cell unit 201 and/or the first control circuit 202 fails.

In some instances, either one of the first control circuit 202 and the second control circuit 204 can direct the alarm device 205 to generate an alarm if the first cell unit 201 and/or the second cell unit 202 fails.

In some embodiments of the disclosure, the alarm device 205 can comprise a loudspeaker providing an audible alarm if the first cell unit 201 and/or the second cell unit 203 fails.

In some embodiments of the disclosure, the alarm device 205 can comprise an indicator lamp providing a visual alarm if the first cell unit 201 and/or the second cell unit 203 fails.

In some instances, the alarm device 205 can comprise both a loudspeaker and an indicator lamp. The alarm device can provide both an audible alarm and a visual alarm if the first cell unit 201 and/or the second cell unit 203 fails.

Optionally, in some embodiments of the present disclosure, the first control circuit 202 and the second control circuit 204 can be integrated in the same circuit module.

In some instances, the embodiments shown in FIGS. 2 and 3 and other embodiments can be combined with one another provided that they are technically compatible. A detailed description is omitted.

Figure 4:
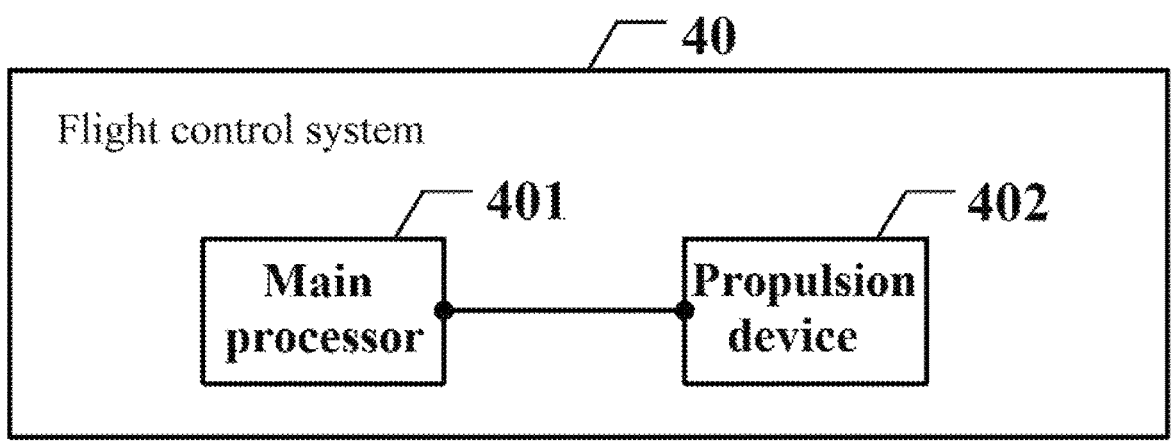
FIG. 4 is a schematic diagram of a flight control system in accordance with an embodiment of the disclosure.

In some instances, the battery can provide a power to a flight control system of, for example, an unmanned aerial vehicle. FIG. 4 shows a block diagram of an example flight control system 40 in accordance with embodiments of the disclosure. The flight control system 40 comprises a main processor 401 configured to detect whether the battery fails and perform a fault handling process and a propulsion device 402 configured to reduce an output power according to the fault handling process.

In some embodiments, the remaining cell(s) of the battery can continue powering the main processor 401 and the propulsion device 402 even if some cells of the battery fail. In these embodiments, an electrical current outputted from the battery can be decreased, and a power provided to an external device, e.g., the flight control system 40, can also be reduced. Once a battery failure is detected, the main processor 401 can perform the failure handling process and direct the propulsion device 402 to reduce the propulsion output power.

In some embodiments of the disclosure, the main processor 401 can be configured to determine a battery failure if a failure signal from the battery is received.

In some embodiments of the disclosure, the main processor 401 can be configured to detect whether a communication connection between the main processor 401 and at least one control circuit of the battery is disconnected, and determine a battery failure if the communication connection between the main processor 401 and the at least one control circuit of the battery is disconnected.

In some embodiments of the disclosure, the main processor 401 can be configured to detect whether a variation in an electric power parameter outputted from the battery exceeds a preset threshold, and determine a battery failure if the variation in the electric power parameter outputted from the battery exceeds the preset threshold.

In some embodiments, the electric power parameter comprises a current or a voltage. A value of the preset threshold can be determined based upon a current or a voltage outputted from one cell unit. Optionally, a value of the preset threshold can be determined based upon the number of cells in one cell unit. Optionally, a value of the preset threshold can be determined based upon other types of parameters.

A voltage and a current outputted from the battery can be substantially stable if the battery operates properly. A determination can be made that at least one cell unit of the battery fails if a variation in the electric power parameter outputted from the battery exceeds the preset threshold. Likewise, a determination can be made that the battery operates properly if a variation in the electric power parameter outputted from the battery does not exceed the preset threshold.

In some embodiments of the disclosure, the main processor 401 can be configured to perform a return process if a battery failure is determined.

Figure 5:
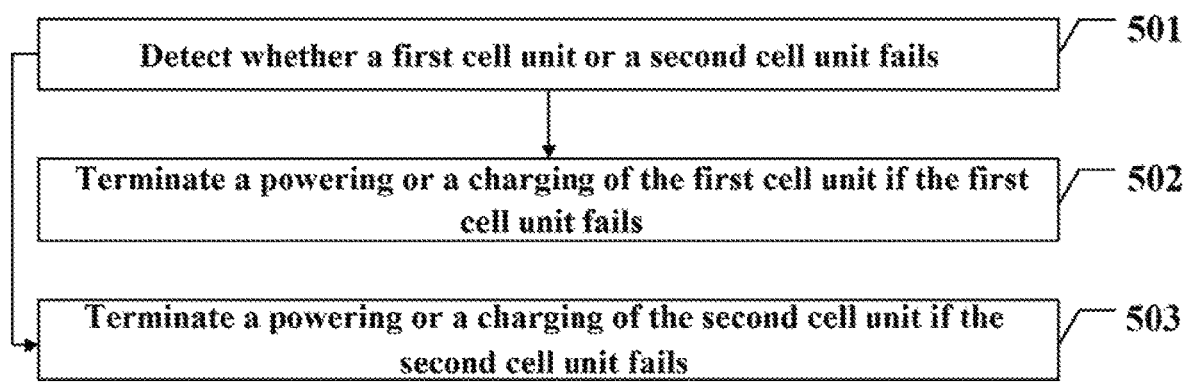
FIG. 5 is a flowchart of a battery management method in accordance with an embodiment of the disclosure.

The battery and the flight control system in accordance with embodiments of the present disclosure are described hereinabove. A battery management method in accordance with embodiments of the disclosure will be described. FIG. 5 shows an example battery management method in accordance with embodiments of the disclosure.

As shown in FIG. 5, at 501, whether a first cell unit or a second cell unit fails is detected.

In some embodiments, the battery can comprise the first cell unit and the second cell unit which are connected in parallel. The battery can detect whether the first cell unit or the second cell unit fails. A process at 502 can be performed if the first cell unit fails. A process at 503 can be performed if the second cell unit fails. A normal operation can be performed if both the first cell unit and the second cell unit do not fail. A detailed description on the normal operation is omitted.

At 502, powering or charging of the first cell unit is terminated if the first cell unit fails.

The battery can terminate powering or charging of the first cell unit if the first cell unit fails.

At 503, powering or charging of the second cell unit is terminated if the second cell unit fails.

The battery can terminate powering or charging of the second cell unit if the second cell unit fails.

In some embodiments of the disclosure, a first failure signal can be transmitted if the first cell unit fails. Additionally or alternatively, the first failure signal can be transmitted if the second cell unit fails.

In some embodiments of the disclosure, the process of detecting whether the first cell unit or the second cell unit fails can be effected by monitoring the first cell unit and the second cell unit using a first control circuit and a second control circuit, respectively.

For example, the first control circuit can be used to detect whether the first cell unit and/or the second cell unit fails. Optionally, the second control circuit can be used to detect whether the second cell unit fails.

In some embodiments of the disclosure, the process of terminating powering or charging of the first cell unit if the first cell unit fails and terminating powering or charging of the second cell unit if the second cell unit fails can be effected by terminating powering or charging of the first cell unit under a control of the first control circuit if the first cell unit fails and terminating powering or charging of the second cell unit under a control of the second control circuit if the second cell unit fails.

In some embodiments of the disclosure, the method can comprise disconnecting a communication connection between the first control circuit and an external device if the first cell unit fails.

In some embodiments of the disclosure, the method can comprise disconnecting a communication connection between the second control circuit and an external device if the second cell unit fails.

In some embodiments of the disclosure, the first control circuit and the second control circuit can communicate with each other. The method can comprise the second control circuit transmitting a signal indicating a failure in the first cell unit and/or the first control circuit if the first cell unit and/or the first control circuit fails.

For example, the second control circuit can transmit a signal indicating a failure in the first cell unit if the first cell unit fails. The second control circuit can transmit a signal indicating a failure in the first control circuit if the first control circuit fails.

In some embodiments of the disclosure, the first control circuit can transmit a signal indicating a failure in the second cell unit and/or the second control circuit if the second cell unit and/or the second control circuit fails.

In some embodiments, the first control circuit can transmit a signal indicating a failure in the second cell unit if the second cell unit fails. The first control circuit can transmit a signal indicating a failure in the second control circuit if the second control circuit fails.

In some embodiments of the disclosure, the first control circuit and the second control circuit can be integrated in one circuit module.

In some embodiments of the disclosure, the process of detecting whether the first cell unit and the second cell unit fail can be effected by detecting whether a current of the first cell unit exceeds a first current threshold, and determining the first cell unit fails if a current of the first cell unit exceeds the first current threshold.

In some embodiments, the first current threshold can be a maximum current that can be carried by the first cell unit or the first control circuit in charging loop or a discharging loop. A value of the first current threshold is not restricted in the disclosure. The first cell unit can be determined as in an over-current state if the current of the first cell unit exceeds the first current threshold. The first cell unit or an electronic element of the first control circuit can be damaged under the over-current state, therefore charging loop or the discharging loop needs be disconnected. For example, if a fault occurs in a load in charging loop or the discharging loop, a short-circuit may occur in a cell and an instantaneous load current in the control circuit may exceed, for example, 10 A. In this situation, the first control circuit can disconnect charging loop or the discharging loop in several milliseconds to assure a safety of the first cell unit.

In some embodiments of the disclosure, the process of detecting whether the first cell unit and the second cell unit fail can be effected by detecting whether a voltage of at least one cell in the first cell unit exceeds a first voltage threshold, and determining the first cell unit fails if the voltage of the at least one cell in the first cell unit exceeds the first voltage threshold.

In some instances, the first voltage threshold is a maximum voltage that a cell can withstand. The first voltage threshold can be, e.g., 4.2V or 4.3V. A specific value of the first voltage threshold is not limited in the disclosure. When the first cell unit is charged by charging device, a voltage of a cell in the first cell unit can increase over time. When the voltage of the cell exceeds the first voltage threshold, it indicates that the cell may be in an over-charge state, and a determination that the first cell unit fails can be made.

In some embodiments of the disclosure, the process of detecting whether the first cell unit and the second cell unit fail can be effected by detecting whether a voltage of at least one cell in the first cell unit falls below a second voltage threshold, and determining the first cell unit fails if the voltage of the at least one cell in the first cell unit falls below the second voltage threshold.

In some embodiments, the second threshold can be a minimum voltage that a cell can bear. The second threshold can be, e.g., 2.3V, 2.4V, or 2.5V. A specific value of the second voltage threshold is not limited in the disclosure. Once the first control circuit detects that the voltage of at least one cell in the first cell unit falls below the second voltage threshold, it indicates that the cell may be in an over-discharge state, and a determination that the first cell unit fails can be made.

In some embodiments of the disclosure, the process of detecting whether the first cell unit and the second cell unit fail can be effected by detecting whether a temperature of at least one cell in the first cell unit is within a first preset temperature range, and determining the first cell unit fails if the temperature of the at least one cell in the first cell unit is outside the first preset temperature range.

In some instances, the first preset temperature range can be an operating temperature range of the first cell unit. An efficiency of electrolytic reaction in an electrolyte solution may decrease if the temperature of the cell unit is below a lower limit of the operating temperature range, and the electrolytic reaction may terminate if the electrolyte solution is frozen. Thus, a determination that the first cell unit fails can be made if the temperature of the cell unit is below the lower limit. On the other hand, a composition material of the cell unit may be subject to an irreversible change if the temperature of the cell unit is higher than an upper limit of the operating temperature range, and the cell unit may even explode at an excessively high temperature. Thus, a determination that the first cell unit fails can be made if the temperature of the cell unit is above the upper limit. For example, an operating temperature range for a lithium-thionyl chloride battery can be between −50° C. and 75°. The operating temperature range of the cell unit can differ with different composition materials. Specific values of the upper limit and the lower limit of the temperature range are not limited in the disclosure.

In some embodiments of the disclosure, the process of detecting whether the second cell unit fail can be effected by detecting whether a current of the second cell unit exceeds a second current threshold, and determining the second cell unit fails if the current of the second cell unit exceeds the second current threshold.

In some embodiments of the disclosure, the process of detecting whether the second cell unit fails can be effected by detecting whether a voltage of at least one cell in the second cell unit exceeds a third voltage threshold, and determining the second cell unit fails if the voltage of the at least one cell in the second cell unit exceeds the third voltage threshold.

In some embodiments of the disclosure, the process of detecting whether the second cell unit fails can be effected by detecting whether a voltage of at least one cell in the second cell unit falls below a fourth voltage threshold, and determining the second cell unit fails if the voltage of the at least one cell in the second cell unit falls below the fourth voltage threshold.

In some embodiments of the disclosure, the process of detecting whether the second cell unit fails can be effected by detecting whether a temperature of at least one cell in the second cell unit is within a second preset temperature range, and determining the second cell unit fails if the temperature of the at least one cell in the second cell unit is outside the second preset temperature range.

In some embodiments, the second preset temperature range can be an operating temperature range of the second cell unit. The second cell unit can be similar to the first cell unit, thus a process of the battery detecting whether the second cell unit fails can be similar to a process of the battery detecting whether the first cell unit fails. A detailed description thereof is omitted.

In some embodiments of the disclosure, the method can further comprise generating an alarm if the first cell unit and/or the second cell unit fails.

In some embodiments of the disclosure, the process of detecting whether the first cell unit and/or the second cell unit fails can be effected by detecting whether the first cell unit and the second cell unit fail using a first control circuit and a second control circuit, respectively.

In some embodiments of the disclosure, the process of generating the alarm if the first cell unit and/or the second cell unit fails can be effected by the first control circuit directing the alarm device to generate the alarm if the first cell unit fails, and the second control circuit directing the alarm device to generate the alarm if the second cell unit fails.

In some embodiments of the disclosure, the first control circuit and the second control circuit can communicate with each other, and the process of generating the alarm if the first cell unit and/or the second cell unit fails can be effected by the first control circuit directing the alarm device to generate the alarm if the second cell unit and/or the second control circuit fails, and the second control circuit directing the alarm device to generate the alarm if the first cell unit and/or the first control circuit fails.

In some embodiments, the alarm device can include a loudspeaker or an alarm lamp. The alarm device can include another device capable of generating an alarm, which is not limited to the illustrative examples.

In some embodiments of the disclosure, the process of generating the alarm if the first cell unit and/or the second cell unit fails can be effected by generating an audible alarm if the first cell unit and/or the second cell unit fails.

In some embodiments of the disclosure, the process of generating the alarm if the first cell unit and/or the second cell unit fails can be effected by generating a visual alarm if the first cell unit and/or the second cell unit fails.

In some embodiments, that the alarm device can comprise both a loudspeaker and an indicator lamp. The alarm device can generate both the audible alarm and the visual alarm if the first cell unit and/or the second cell unit fails.

Figure 6:
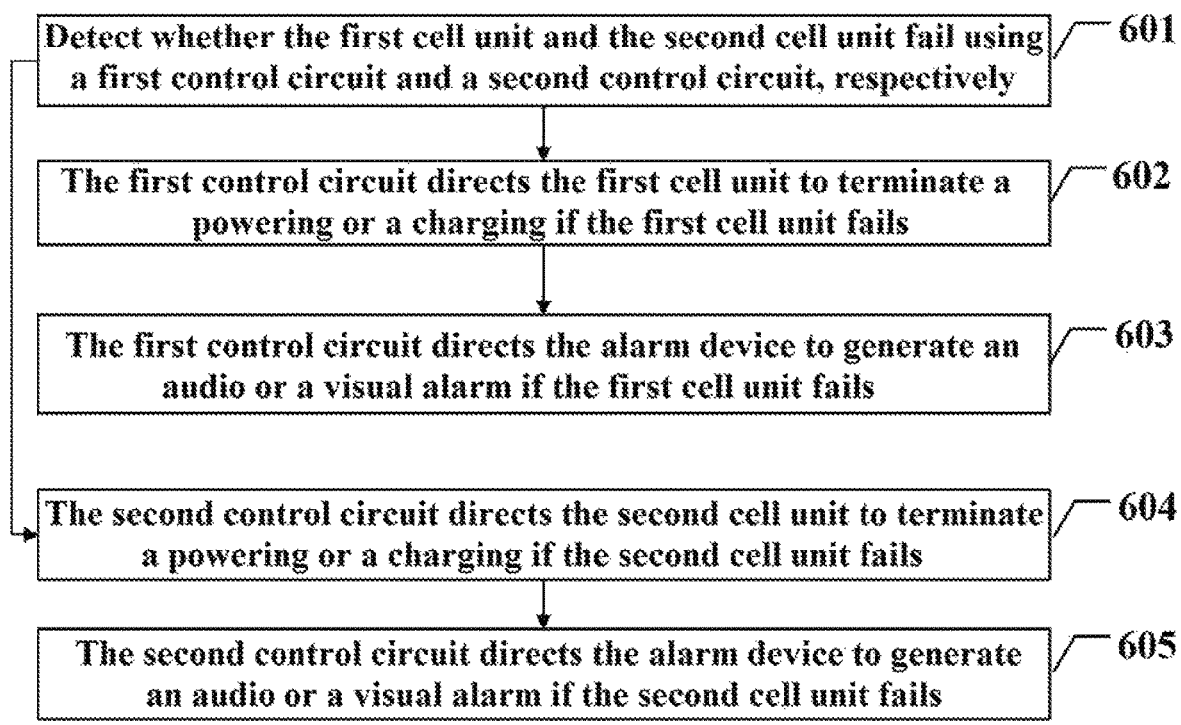
FIG. 6 is another flowchart of a battery management method in accordance with an embodiment of the disclosure.

FIG. 6 shows another example battery management method in accordance with embodiments of the disclosure. As shown in FIG. 6, at 601, whether the first cell unit and the second cell unit fail is detected using a first control circuit and a second control circuit, respectively.

The battery can detect whether the first cell unit and the second cell unit fail using the first control circuit and the second control circuit, respectively. Process 602 or process 603 can be performed if the first cell unit fails. Process 604 or process 605 can be performed if the second cell unit fails.

At 602, the first control circuit directs the first cell unit to terminate powering or charging if the first cell unit fails.

At 603, the first control circuit directs the alarm device to generate an alarm if the first cell unit fails.

At 604, the second control circuit directs the second cell unit to terminate powering or charging if the second cell unit fails.

At 605, the second control circuit directs the alarm device to generate an alarm if the second cell unit fails.

Process 603 can be performed after or before process 602, and process 604 can be performed after or before process 603. An order of performing the processes is not limited to the illustrative example.

Figure 7:
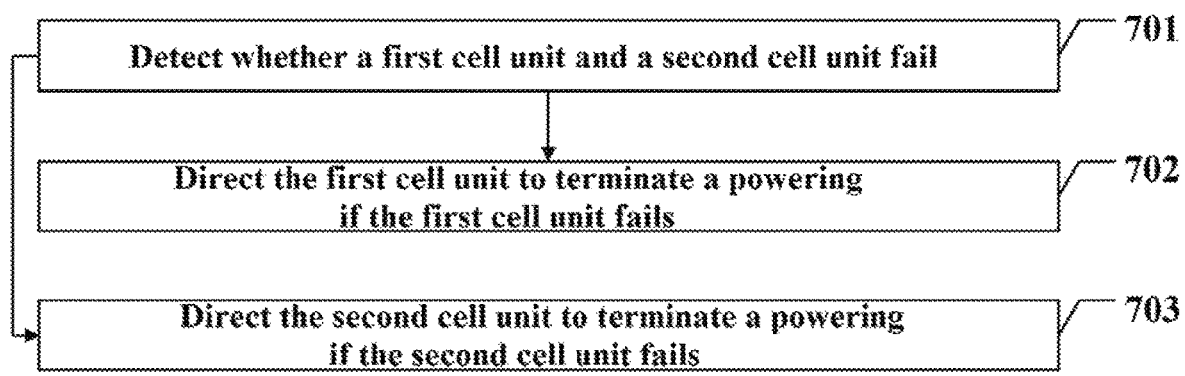
FIG. 7 is a flowchart of a flight control method in accordance with an embodiment of the disclosure.

FIG. 7 shows an example flight control method in accordance with embodiments of the disclosure. As shown in FIG. 7, at 701, whether a first cell unit and a second cell unit fail is detected.

In some embodiments, an unmanned aerial vehicle can comprise a battery. The battery can comprise the first cell unit and the second cell unit, which are connected with each other in parallel. The unmanned aerial vehicle can detect whether the first cell unit and the second cell unit fail. Process 702 can be performed if the first cell unit fails. Process 703 can be performed if the second cell unit fails. A process of detecting whether the first cell unit and the second cell unit fail to supply power to external devices can be performed if both the first cell unit and the second cell unit do not fail. A detailed description thereof is omitted.

At 702, the first cell unit is directed to terminate powering if the first cell unit fails. For example, the unmanned aerial vehicle can direct the first cell unit to terminate powering if the first cell unit fails.

At 703, the second cell unit is directed to terminate powering if the second cell unit fails. For example, the unmanned aerial vehicle can direct the second cell unit to terminate powering if the second cell unit fails.

In some embodiments of the disclosure, the method can comprise transmitting a signal indicating a failure in the first cell unit if the first cell unit fails.

In some embodiments of the disclosure, the method can comprise transmitting a signal indicating a failure in the second cell unit if the second cell unit fails.

In some embodiments of the disclosure, the process of detecting whether the first cell unit and the second cell unit fail can be effected by detecting whether the first cell unit and the second cell unit fail using a first control circuit and a second control circuit, respectively.

In some embodiments, the first control circuit can be configured to detect whether the first cell unit and/or the second cell unit fails. The second control circuit can be similarly configured to detect whether the first cell unit and/or the second cell unit fail.

In some embodiments of the disclosure, the process of directing the first cell unit to terminate powering if the first cell unit fails or directing the second cell unit to terminate powering if the second cell unit fails can be effected by the first control circuit directing the first cell unit to terminate powering or charging if the first cell unit fails, and the second control circuit directing the second cell unit to terminate powering or charging if the second cell unit fails.

In some embodiments of the disclosure, the method can further comprise, disconnecting a communication connection between the first control circuit and an external device if the first cell unit fails.

In some embodiments, the first control circuit can be in communication connection with the external device. The communication connection between the first control circuit and the external device can be disconnected if the first cell unit fails. The external device can learn a failure of the first cell unit by detecting the communication disconnection.

In some embodiments of the disclosure, a communication connection between the second control circuit and an external device can be disconnected if the second cell unit fails.

In some embodiments, the second control circuit can be in communication connection with the external device. The communication connection between the second control circuit and the external device can be disconnected if the second cell unit fails. The external device can learn a failure of the second cell unit by detecting the communication disconnection.

In some embodiments of the disclosure, the first control circuit and the second control circuit can communicate with each other. The method can comprise the second control circuit transmitting a signal indicating a failure in the first cell unit and/or the first control circuit if the first cell unit and/or the first control circuit fails.

For example, the second control circuit can transmit a signal indicating a failure in the first cell unit if the first cell unit fails. The second control circuit can transmit a signal indicating a failure in the first control circuit if the first control circuit fails. The second control circuit can transmit a signal indicating a failure in the first cell unit and the first control circuit if both the first cell unit and the first control circuit fail.

In some embodiments of the disclosure, the first control circuit and the second control circuit can communicate with each other. The method can comprise the first control circuit transmitting a signal indicating a failure in the second cell unit and/or the second control circuit if the second cell unit and/or the second control circuit fail.

For example, the first control circuit can transmit a signal indicating a failure in the second cell unit if the second cell unit fails. The first control circuit can transmit a signal indicating a failure in the second control circuit if the second control circuit fails. The first control circuit can transmit a signal indicating a failure in the second cell unit and the second control circuit if both the second cell unit and the second control circuit fail.

In some embodiments of the disclosure, the first control circuit and the second control circuit can be integrated in one circuit module.

In some embodiments of the disclosure, the process of detecting whether the first cell unit and the second cell unit fail can be effected by detecting whether a current of the first cell unit exceeds a first current threshold, and determining the first cell unit fails if the current of the first cell unit exceeds the first current threshold.

In some embodiments of the disclosure, the process of detecting whether the first cell unit and the second cell unit fail can be effected by detecting whether a voltage of at least one cell in the first cell unit exceeds a first voltage threshold, and determining the first cell unit fails if the voltage of the at least one cell in the first cell unit exceeds the first voltage threshold.

In some embodiments of the disclosure, the process of detecting whether the first cell unit and the second cell unit fail can be effected by detecting whether a voltage of at least one cell in the first cell unit is below a second voltage threshold, and determining the first cell unit fails if the voltage of the at least one cell in the first cell unit falls below the second voltage threshold.

In some embodiments of the disclosure, the process of detecting whether the first cell unit and the second cell unit fail can be effected by detecting whether a temperature of at least one cell in the first cell unit is within a first preset temperature range, and determining the first cell unit fails if the temperature of the at least one cell in the first cell unit is outside the first preset temperature range.

In some embodiments of the disclosure, the process of detecting whether the first cell unit and the second cell unit fail can be effected by detecting whether a current of the second cell unit exceeds a second current threshold, and determining the second cell unit fails if the current of the second cell unit exceeds the second current threshold.

In some embodiments of the disclosure, the process of detecting whether the first cell unit and the second cell unit fail can be effected by detecting whether a voltage of at least one cell in the second cell unit exceeds a third voltage threshold, and determining the second cell unit fails if the voltage of the at least one cell in the second cell unit exceeds the third voltage threshold.

In some embodiments of the disclosure, the process of detecting whether the first cell unit and the second cell unit fail can be effected by detecting whether a voltage of at least one cell in the second cell unit falls below a fourth voltage threshold, and determining the second cell unit fails if the voltage of the at least one cell in the second cell unit falls below the fourth voltage threshold.

In some embodiments of the disclosure, the process of detecting whether the first cell unit and the second cell unit fail can be effected by detecting whether a temperature of at least one cell in the second cell unit is within a second preset temperature range, and determining the second cell unit fails if the temperature of the at least one cell in the second cell unit is outside a second preset temperature range.

In some embodiments of the disclosure, the method can comprise transmitting an alarm to a ground terminal if the first cell unit and/or the second cell unit fails.

In some embodiments, the ground terminal can be a remote controller or another ground control device of a ground control station. The ground terminal is not limited to the illustrative examples. The unmanned aerial vehicle can transmit the alarm to the ground terminal using an alarm device if the first cell unit or/the second cell unit fails. In some embodiments, the alarm device can be provided at the battery, the unmanned aerial vehicle, or the remote controller. A location of the alarm device is not limited to the illustrative examples. The unmanned aerial vehicle can transmit to the remote controller information indicating a failure in the battery of the unmanned aerial vehicle if the alarm device is provided at the remote controller, and the alarm device of the remote controller can generate an alarm.

In some embodiments of the disclosure, the process of detecting whether the first cell unit and the second cell unit fail can be effected by detecting whether the first cell unit and the second cell unit fail using a first control circuit and a second control circuit, respectively.

In some embodiments of the disclosure, the process of generating the alarm if the first cell unit and/or the second cell unit fails can be effected by the first control circuit directing the alarm device to generate an alarm if the first cell unit fails, and the second control circuit directing the alarm device to generate an alarm if the second cell unit fails.

In some embodiments, the battery can comprise the alarm device. The first control circuit and the second control circuit can both be in communication connection with the alarm device. The first control circuit can be configured to direct the alarm device to generate an alarm if the first cell unit fails. The second control circuit can be configured to direct the alarm device to generate an alarm if the second cell unit fails.

In some embodiments of the disclosure, the first control circuit and the second control circuit can communicate with each other. The process of generating the alarm if the first cell unit and/or the second cell unit fail can be effected by the first control circuit directing the alarm device to generate an alarm if the second cell unit and/or the second control circuit fails, and the second control circuit directing the alarm device to generate an alarm if the first cell unit and/or the first control circuit fails.

In some embodiments, the battery can comprise the alarm device. The first control circuit and the second control circuit can both be in communication connection with the alarm device. The first control circuit can be configured to direct the alarm device to generate an alarm if the second cell unit and/or the second control circuit fails. The second control circuit can be configured to direct the alarm device to generate an alarm if the first cell unit and/or the first control circuit fails.

In some embodiments of the disclosure, the process of generating the alarm if the first cell unit and/or the second cell unit fails can be effected by generating an audible alarm if the first cell unit and/or the second cell unit fails.

In some embodiments, a flight control system can comprise the alarm device. If the first cell unit and/or the second cell unit fails, the flight control system can detect the failure and direct the alarm device to generate an audible alarm.

In some embodiments of the disclosure, the process of generating the alarm if the first cell unit and/or the second cell unit fails can be effected by generating a visual alarm if the first cell unit and/or the second cell unit fails.

In some embodiments, if the first cell unit and/or the second cell unit fails, the flight control system can detect the failure and direct the alarm device to generate a visual alarm.

In some embodiments of the disclosure, the method can comprise directing the unmanned aerial vehicle to enter into a power shortage mode if the first cell unit or the second cell unit fails.

In some embodiments, the first cell unit can terminate powering to the flight control system of the unmanned aerial vehicle if the first cell unit fails, therefore an energy available to the flight control system is reduced. In these embodiments, the flight control system can direct the unmanned aerial vehicle to enter into the power shortage mode.

In some embodiments of the disclosure, the process of directing the unmanned aerial vehicle to enter into the power shortage mode can be effected by reducing a propulsion output power of the unmanned aerial vehicle.

For example, the flight control system can direct to reduce the propulsion output power of the unmanned aerial vehicle.

In some embodiments of the disclosure, the process of directing the unmanned aerial vehicle to enter into the power shortage mode can be effected by directing the unmanned aerial vehicle to perform an automatic return flight.

For example, the flight control system can direct the unmanned aerial vehicle to perform the automatic return flight.

In some embodiments of the disclosure, the process of directing the unmanned aerial vehicle to enter into the power shortage mode can be effected by directing the unmanned aerial vehicle to perform a direct landing.

For example, the flight control system can control the unmanned aerial vehicle to perform the direct landing.

The process of reducing the propulsion output power can be performed simultaneously with the process of directing the unmanned aerial vehicle to perform the automatic return flight or directing the unmanned aerial vehicle to perform the direct landing by the flight control system. A detailed description thereof is omitted.

The embodiment shown in FIG. 7 and other embodiments can be combined with one another provided that they are technically compatible. A detailed description thereof is omitted.

Figure 8:
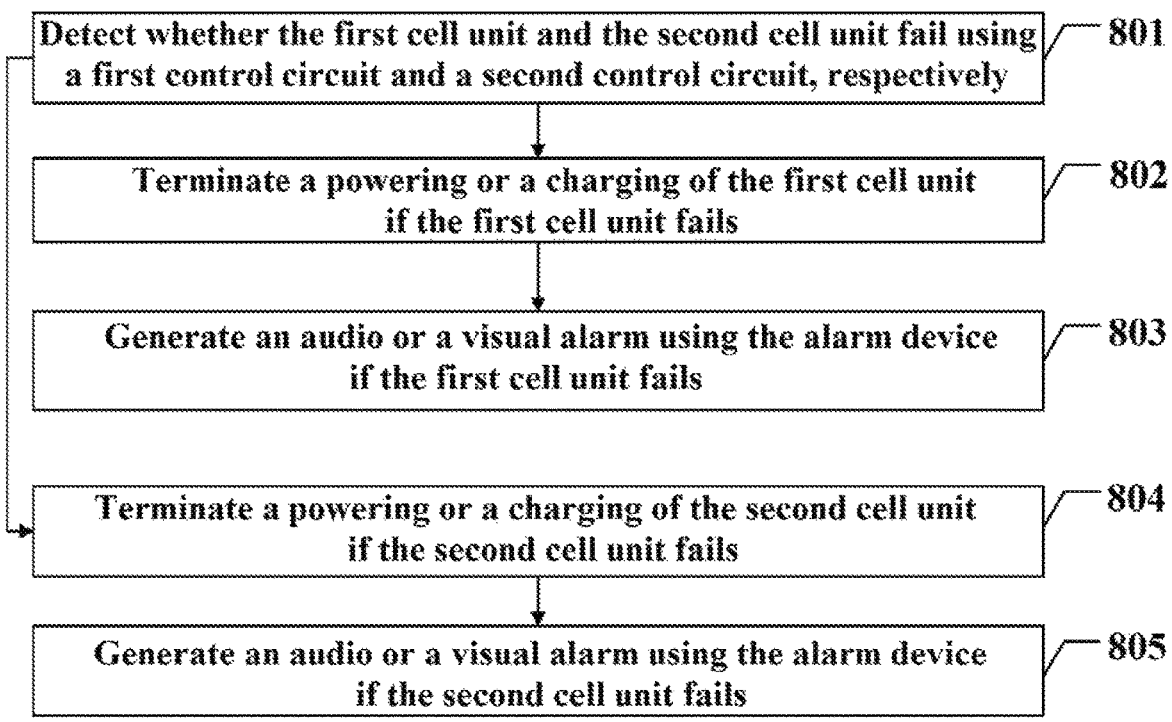
FIG. 8 is another flowchart of a flight control method in accordance with an embodiment of the disclosure.

FIG. 8 shows a flow chart of another example flight control method in accordance with embodiments of the disclosure. As shown in FIG. 8, at 801, whether a first cell unit or a second cell unit fails is detected using a first control circuit and a second control circuit, respectively.

At 802, the first cell unit is directed to terminate powering or charging if the first cell unit fails.

At 803, an alarm device is directed to generate an audible alarm or generate a visual alarm if the first cell unit fails.

At 804, the second cell unit is directed to terminate powering or charging if the second cell unit fails.

At 805, the alarm device is directed to generate an audible alarm or generate a visual alarm if the second cell unit fails.

Process 803 can be performed after or before process 802, and process 805 can be performed after or before process 804. An order of performing the processes is not limited to the illustrative example.

The flight control method in accordance with embodiments of the disclosure will be will be described by reference to a specific application scenario.

In the specific application scenario of the embodiment, an unmanned aerial vehicle can comprise a battery. The battery can comprise a cell unit 1 and a cell unit 2.

In some embodiments, the battery can further comprise a control circuit 1 and a control circuit 2 where the control circuit 1 can be a failure monitoring circuit of the cell unit 1 and the control circuit 2 can be a failure monitoring circuit of the cell unit 2. The control circuit 1 of the battery can be configured to detect a failure of the cell unit 1. If a failure of the cell unit 1 is detected, the control circuit 1 can disconnect a circuit between the cell unit 1 and a flight control system and the flight control system can enter into a power shortage mode.

In some embodiments, the control circuit 1 can transmit to the flight control system of the unmanned aerial vehicle a signal error1 indicating a failure of the cell unit 1. The flight control system can reduce a propulsion output power based upon the signal error 1 and direct the unmanned aerial vehicle to perform an automatic return flight.

In some embodiments, the battery can comprise a loudspeaker and an indicator lamp. The control circuit 1 can direct the loudspeaker to generate an audible alarm and direct the indicator lamp to generate a visual alarm if the cell unit 1 fails.

In some embodiments, the control circuit 1 and the control circuit 2 can communicate with each other. The control circuit 1 can be configured to further detect a failure of the cell unit 2 or a failure of the control circuit 2. The control circuit 1 can transmit to the flight control system of the unmanned aerial vehicle a signal error2 indicating a failure of the cell unit 2 if a failure of the cell unit 2 or a failure of the control circuit 2 is detected. The flight control system can reduce the propulsion output power based upon the signal error2 and direct the unmanned aerial vehicle to perform the automatic return flight.

In some embodiments, the flight control system can determine a failure of the cell unit 1 fails and direct the unmanned aerial vehicle to perform an automatic return flight if detecting a disconnection of the circuit between the cell unit 1 and the flight control system.

In case no control circuit is provided to the battery, if the flight control system detects a failure of the cell unit 1, the flight control system can disconnect a supply circuit through which the cell unit 1 provides power to an external device, reduce the propulsion output power and direct the alarm device to generate an alarm.

The above-described embodiments are merely illustrative embodiments. Other embodiments can be appreciated with reference to FIG. 7 or FIG. 8. A detailed description thereof is omitted.

Figure 9:
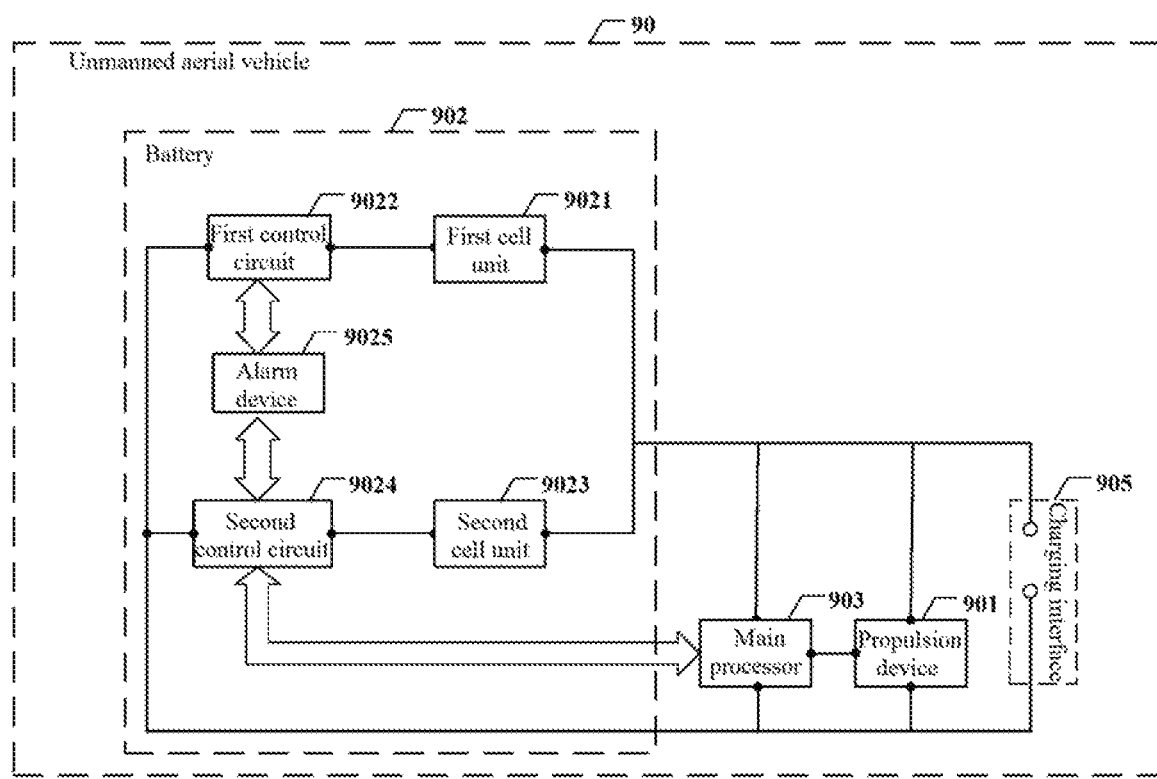
FIG. 9 is a schematic diagram of an unmanned aerial vehicle (UAV) in accordance with an embodiment of the disclosure.

FIG. 9 shows an example unmanned aerial vehicle 90 in accordance with embodiments of the disclosure. The unmanned aerial vehicle 90 comprises a propulsion device 901, a battery 902, and a main processor 903.

The propulsion device 901 can be configured to provide a propulsion, e.g., for the unmanned aerial vehicle 90 to fly. The battery 902 can provide an electric energy to the propulsion device 90. In some embodiments, as shown in FIG. 9, the battery 902 comprises a first cell unit 9021, a first control circuit 9022, a second cell unit 9023, and a second control circuit 9024. The first cell unit 9021 and the second cell unit 9023 can be connected with each other in parallel. Each of the first cell unit 9021 and the second cell unit 9023 can comprise at least one cell. The first control circuit 9022 can be electrically connected with the first cell unit 9021 to detect a failure of the first cell unit 9021. The second control circuit 9024 can be electrically connected with the second cell unit 9023 to detect a failure of the second cell unit 9023. The first control circuit 9022 can direct the first cell unit 9021 to terminate powering or charging if the first cell unit 9021 fails. The second control circuit 9024 can direct the second cell unit 9023 to terminate powering or charging if the second cell unit 9023 fails.

The main processor 903 can be configured to control a flight parameter. The main processor 903 can be electrically connected with the propulsion device 901 and the battery 902.

In some embodiments of the disclosure, the first control circuit 9022 can transmit to the main processor 903 a signal indicating a failure in the first cell unit 9021 if the first cell unit 9021 fails.

In some embodiments of the disclosure, the first control circuit 9022 can disconnect a transmission with the main processor 903 if the first cell unit 9021 fails.

In some embodiments of the disclosure, the second control circuit 9024 can transmit to the main processor 903 a signal indicating a failure in the second cell unit 9023 if the second cell unit 9023 fails.

In some embodiments of the disclosure, the second control circuit 9024 can disconnect a transmission to the main processor 903 if the second cell unit 9023 fails.

In some embodiments of the disclosure, the second control circuit 9024 and the first control circuit 9022 can communicate with each other.

In some embodiments of the disclosure, the first control circuit 9022 can transmit to the main processor 903 a signal indicating a failure in the second cell unit 9023 or the second control circuit 9024 if the second cell unit 9023 or the second control circuit 9024 fails, and/or, the second control circuit 9024 can transmit to the main processor 902 a signal indicating a failure in the first cell unit 9021 or in the first control circuit 9022 if the first cell unit 9021 or the first control circuit 9022 fails.

In some embodiments of the disclosure, the first control circuit 9022 can comprise a monitoring circuit and a MOS transistor. The monitoring circuit can output a control signal to the MOS transistor if the first cell unit 9021 fails. The MOS transistor can disconnect an electrical connection between the first cell unit 9021 and a power output terminal of the first control circuit 9022 in response to the control signal.

In some embodiments of the disclosure, the first control circuit 9022 can detect whether a current of the first cell unit 9021 exceeds a first current threshold. A determination that the first cell unit 9201 fails can be made if the current of the first cell unit 9021 exceeds the first current threshold.

In some embodiments of the disclosure, the first control circuit 9022 can be configured to detect whether a voltage of at least one cell in the first cell unit 9021 exceeds a first voltage threshold. A determination that the first cell unit 9201 fails can be made if the voltage of the at least one cell in the first cell unit 9201 exceeds the first voltage threshold.

In some embodiments of the disclosure, the first control circuit 9022 can be configured to detect whether a voltage of at least one cell in the first cell unit 9021 is below a second voltage threshold. A determination that the first cell unit 9201 fails can be made if the voltage of the at least one cell in the first cell unit 9201 is below the second voltage threshold.

In some embodiments of the disclosure, the first control circuit 9022 can be configured to detect whether a temperature of at least one cell in the first cell unit 9021 is within a first preset temperature range. A determination that the first cell unit 9201 fails can be made if the temperature of the at least one cell in the first cell unit 9201 is outside the first preset temperature range.

In some embodiments of the disclosure, the second control circuit 9024 can comprise a monitoring circuit and a MOS transistor. The monitoring circuit can output a control signal to the MOS transistor if the second cell unit fails. The MOS transistor can disconnect an electrical connection between the second cell unit and a power output terminal of the second control circuit in response to the control signal.

In some embodiments of the disclosure, the second control circuit 9024 can be configured to detect whether a current of the second cell unit 9023 exceeds a second current threshold. A determination that the second cell unit 9203 fails can be made if the current of the second cell unit 9023 exceeds the second current threshold. In some instances, the second current threshold can be identical to the first current threshold. Optionally, the second current threshold can be different from the first current threshold.

In some embodiments of the disclosure, the second control circuit 9024 can be configured to detect whether a voltage of at least one cell in the second cell unit 9023 exceeds a third voltage threshold. A determination that the second cell unit 9203 fails can be made if the voltage of the at least one cell in the second cell unit 9023 exceeds the third voltage threshold.

In some embodiments, the third voltage threshold can be identical to the first voltage threshold. Optionally, the third voltage threshold can be different from the first voltage threshold.

In some embodiments of the disclosure, the second control circuit 9024 can be configured to detect whether a voltage of at least one cell in the second cell unit 9023 is below a fourth voltage threshold. A determination that the second cell unit 9203 fails can be made if the voltage of the at least one cell in the second cell unit 9023 is below the fourth voltage threshold.

In some embodiments, the fourth voltage threshold can be identical to the second voltage threshold. Optionally, the fourth voltage threshold can be different from the second voltage threshold.

In some embodiments of the disclosure, the second control circuit 9024 can be configured to detect whether a temperature of at least one cell in the second cell unit 9023 is within a second preset temperature range. A determination that the second cell unit 9203 fails can be made if the temperature of the at least one cell in the second cell unit 9023 is outside the second preset temperature range.

In some embodiments, the second preset temperature range can be identical to the first preset temperature range. Optionally, the second preset temperature range can be different from the first preset temperature range.

In some embodiments of the disclosure, as shown in FIG. 9, the battery 902 further comprises an alarm device 9025. The first control circuit 9022 and the second control circuit 9024 can both be in communication connection with the alarm device 9025. The alarm device 9025 can generate an alarm if the first cell unit 9021 and/or the second cell unit 9023 fails.

In some embodiments of the disclosure, the first control circuit 9022 can direct the alarm device 9025 to generate an alarm if the first cell unit 9021 fails. Additionally or alternatively, the second control circuit 9024 can direct the alarm device 9025 to generate an alarm if the second cell unit 9023 fails.

In some embodiments of the disclosure, the first control circuit 9022 and the second control circuit 9024 can communicate with each other. The first control circuit 9022 can direct the alarm device 9025 to generate an alarm if the second cell unit 9023 and/or the second control circuit 9024 fails.

In some embodiments of the disclosure, the first control circuit 9022 and the second control circuit 9024 can communicate with each other. The second control circuit 9024 can direct the alarm device 9025 to generate an alarm if the first cell unit 9021 and/or the first control circuit 9023 fails.

In some embodiments of the disclosure, the alarm device 9025 can comprise a loudspeaker providing an audible alarm if the first cell unit and/or the second cell unit fails.

In some embodiments of the disclosure, the alarm device 9025 can comprise an indicator lamp providing a visual alarm if the first cell unit and/or the second cell unit fails.

In some embodiments of the disclosure, the first control circuit 9022 and the second control circuit 9024 can be integrated in the same circuit module.

In some embodiments of the disclosure, the main processor 903 can be configured to enter into a power shortage mode upon receiving a failure signal of the battery 902.

In some embodiments of the disclosure, the main processor 903 can be configured to reduce a propulsion output power of the unmanned aerial vehicle 90 upon receiving a failure signal of the battery 902. In some other embodiments, the main processor 903 can be configured to direct the unmanned aerial vehicle 90 to perform an automatic return flight upon receiving the failure signal of the battery 902. In some other embodiments, the main processor 903 can be configured to direct the unmanned aerial vehicle 90 to perform a direct landing upon receiving the failure signal of the battery 902.

The battery 902 in accordance with embodiments of the disclosure can be similar to the battery 20 shown in FIG. 2. A detailed description thereof is omitted. An interaction between various components of the battery 902 can be similar to the embodiment or optional embodiments of the example device described with reference to FIG. 2 or FIG. 3.

The embodiment shown in FIG. 9 and other embodiments can be combined with one another provided they are technically compatible. A detailed description thereof is omitted.

Figure 10:
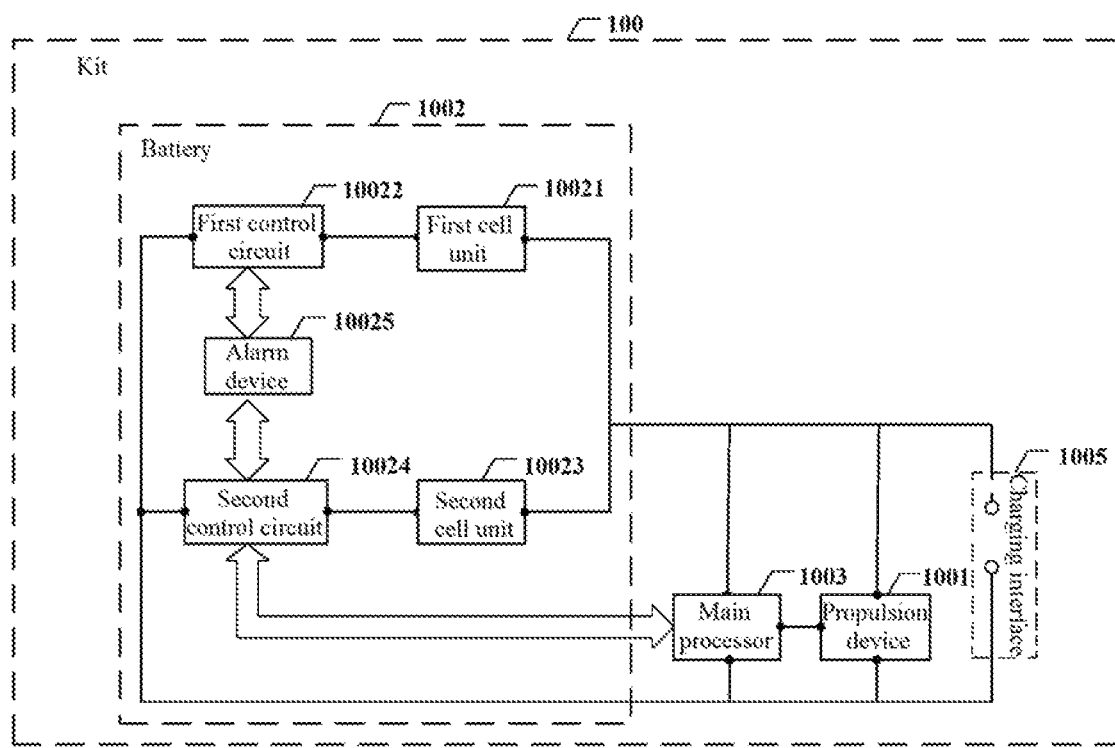
FIG. 10 is a schematic diagram of a kit for assembling a UAV in accordance with an embodiment of the disclosure.

FIG. 10 shows an example kit 100 for assembling as an unmanned aerial vehicle in accordance with embodiments of the disclosure. The kit 100 comprises a propulsion device 1001, a battery 1002, and a main processor 1003.

The propulsion device 1001 can be configured to provide a propulsion, e.g., for flight. The battery 1002 can provide an electric energy to the propulsion device 1001. In some embodiments, as shown in FIG. 10, the battery 1002 comprises a first cell unit 10021, a first control circuit 10022, a second cell unit 10023, and a second control circuit 10024. The first cell unit 10021 and the second cell unit 10023 can be connected with each other in parallel. The first cell unit 10021 and the second cell unit 10023 can comprise at least one cell. The first control circuit 10022 can be electrically connected with the first cell unit 10021 to detect a failure of the first cell unit 10021. The second control circuit 10024 can be electrically connected with the second cell unit 10023 to detect a failure of the second cell unit 10023.

The main processor 1003 can be configured to control a flight parameter. In some embodiments, once the kit 100 of the unmanned aerial vehicle is assembled, the main processor 1003 can be electrically connected with the propulsion device 1001 and the battery 1002. The first control circuit 10022 can direct the first cell unit 10021 to terminate powering or charging if the first cell unit 10021 fails. The second control circuit 10024 can direct the second cell unit 10023 to terminate powering or charging if the second cell unit 10023 fails.

In some embodiments, the first control circuit 10022 can disconnect an electrical connection between the cell unit 10021 and an external device, terminate charging of first cell unit 10021 from the external device or terminate powering the propulsion device 1001.

In some embodiments of the disclosure, the first control circuit 10022 can transmit to the main processor 1003 a signal indicating a failure in the first cell unit 10021 if the first cell unit 10021 fails.

In some embodiments of the disclosure, the first control circuit 10022 can disconnect a transmission with the main processor 1003 if the first cell unit 10021 fails.

In some embodiments of the disclosure, the second control circuit 10024 can transmit to the main processor 1003 a signal indicating a failure in the second cell unit 10023 if the second cell unit 10023 fails.

In some embodiments of the disclosure, the second control circuit 10024 can disconnect a transmission to the main processor 1003 if the second cell unit 10023 fails.

In some embodiments of the disclosure, the second control circuit 10024 and the first control circuit 10022 can communicate with each other.

In some embodiments of the disclosure, the first control circuit 10022 can transmit to the main processor 1003 a signal indicating a failure in the second cell unit 10023 or the second control circuit 10024 if the second cell unit 10023 or the second control circuit 10024 fails.

In some embodiments of the disclosure, the second control circuit 10024 can transmit to the main processor 1002 a signal indicating a failure in the first cell unit 10021 or in the first control circuit 10022 if the first cell unit 10021 or the first control circuit 10022 fails.

The second control circuit 10024 can transmit to the main processor 1003 a signal indicating a failure in the first cell unit 10021 if the first cell unit 10021 fails. Additionally or alternatively, the second control circuit 10024 can transmit to the main processor 1003 a signal indicating a failure in the first control circuit 10022 if the first control circuit 10022 fails.

In some embodiments of the disclosure, the first control circuit 10022 can comprise a monitoring circuit and a MOS transistor. The monitoring circuit can output a control signal to the MOS transistor if the first cell unit fails. The MOS transistor can disconnect an electrical connection between the first cell unit and a power output terminal of the first control circuit in response to the control signal.

In some embodiments of the disclosure, the first control circuit 10022 can detect whether a current of the first cell unit exceeds a first current threshold. A determination that the first cell unit fails can be made if the current of the first cell unit exceeds the first current threshold.

In some embodiments of the disclosure, the first control circuit 10022 can be configured to detect whether a voltage of at least one cell in the first cell unit exceeds a first voltage threshold. A determination that the first cell unit fails can be made if the voltage of the at least one cell in the first cell unit exceeds the first voltage threshold.

In some embodiments of the disclosure, the first control circuit 10022 can be configured to detect whether a voltage of at least one cell in the first cell unit is below a second voltage threshold. A determination that the first cell unit fails can be made if the voltage of the at least one cell in the first cell unit is below the second voltage threshold.

In some embodiments of the disclosure, the first control circuit 10022 can be configured to detect whether a temperature of at least one cell in the first cell unit is within a first preset temperature range. A determination that the first cell unit fails can be made if the temperature of the at least one cell in the first cell unit is outside the first preset temperature range.

In some embodiments of the disclosure, the second control circuit 10024 can comprise a monitoring circuit and a MOS transistor. The monitoring circuit can output a control signal to the MOS transistor if the second cell unit fails. The MOS transistor can disconnect an electrical connection between the second cell unit and a power output terminal of the second control circuit in response to the control signal.

In some embodiments of the disclosure, the second control circuit 10024 can be configured to detect whether a current of the second cell unit exceeds a second current threshold. A determination that the second cell unit fails can be made if the current of the second cell unit exceeds the first current threshold.

In some embodiments of the disclosure, the second control circuit 10024 can be configured to detect whether a voltage of at least one cell in the second cell unit exceeds a third voltage threshold. A determination that the second cell unit fails can be made if the voltage of the at least one cell in the second cell unit exceeds the third voltage threshold.

In some embodiments of the disclosure, the second control circuit 10024 can be configured to detect whether a voltage of at least one cell in the second cell unit is below a fourth voltage threshold. A determination that the second cell unit fails can be made if the voltage of the at least one cell in the second cell unit is below the fourth voltage threshold.

In some embodiments of the disclosure, the second control circuit 10024 can be configured to detect whether a temperature of at least one cell in the second cell unit is within a second preset temperature range. A determination that the second cell unit fails can be made if the temperature of the at least one cell in the second cell unit is outside the second preset temperature range.

In some embodiments of the disclosure, as shown in FIG. 10, the battery 1002 further comprises an alarm device 10025. The first control circuit 10022 and the second control circuit 10024 can both be in communication connection with the alarm device 10025. The alarm device 10025 can generate an alarm if the first cell unit 10021 and/or the second cell unit 10023 fails.

In some embodiments of the disclosure, the first control circuit 10022 can direct the alarm device 10025 to generate an alarm if the first cell unit 10021 fails. Additionally or alternatively, the second control circuit 10024 can direct the alarm device 10025 to generate an alarm if the second cell unit 10023 fails.

In some embodiments of the disclosure, the first control circuit 10022 and the second control circuit 10024 can communicate with each other when the battery 1002 operates. The first control circuit 10022 can direct the alarm device 10025 to generate an alarm if the second cell unit 10023 and/or the second control circuit 10024 fails. Additionally or alternatively, the second control circuit 10024 can direct the alarm device 10025 to generate an alarm if the first cell unit 10021 and/or the first control circuit 10023 fails.

In some embodiments of the disclosure, the alarm device 10025 can comprise a loudspeaker providing an audible alarm if the first cell unit 10021 and/or the second cell unit 10023 fails.

In some embodiments of the disclosure, the alarm device 10025 can comprise an indicator lamp providing a visual alarm if the first cell unit 10021 and/or the second cell unit 10023 fails.

In some embodiments of the disclosure, the first control circuit 10022 and the second control circuit 10024 can be integrated in the same circuit module.

In some embodiments of the disclosure, the main processor 1003 can be configured to enter into a power shortage mode upon receiving a failure signal of the battery 1002.

In some embodiments of the disclosure, the main processor 1003 can be configured to reduce a propulsion output power of the unmanned aerial vehicle.

In some embodiments of the disclosure, the main processor 1003 can be configured to direct the unmanned aerial vehicle to perform an automatic return flight.

In some embodiments of the disclosure, the main processor 1003 can be configured to direct the unmanned aerial vehicle to perform a direct landing.

The battery 1002 in accordance with embodiments of the disclosure can be similar to the battery 20 shown in FIG. 2. A detailed description thereof is omitted. An interaction between various components in the battery 1002 can be similar to the embodiment or optional embodiments of the example device described with reference to FIG. 2 or FIG. 3.

It will be apparent that, the embodiment shown in FIG. 10 and other embodiments can be combined with one another provided they are technically compatible. A detailed description thereof is omitted.

Figure 11:
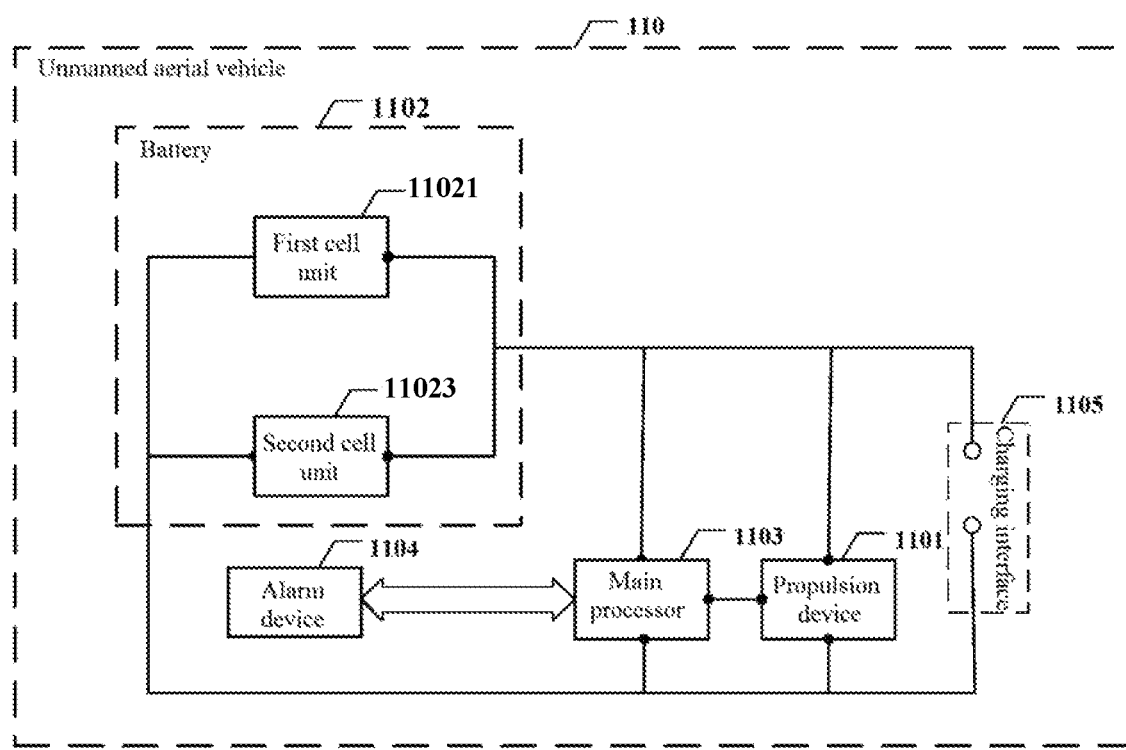
FIG. 11 is another schematic diagram of a UAV in accordance with an embodiment of the disclosure.

FIG. 11 shows another example unmanned aerial vehicle 110 in accordance with embodiments of the disclosure. The unmanned aerial vehicle 110 comprises a propulsion device 1101, a battery 1102, and a main processor 1103.

The propulsion device 1101 can be configured to provide a propulsion, e.g., for the unmanned aerial vehicle 110 to fly. The battery 1102 can provide an electric energy to the propulsion device 1101. In some embodiments, as shown in FIG. 11, the battery 1102 comprises a first cell unit 11021 and a second cell unit 11023 which are connected in parallel. Each of the first cell unit 11021 and the second cell unit 11023 can comprise at least one cell.

The main processor 1103 can be electrically connected with the propulsion device 1101 and the battery 1102. The main processor 1103 can be configured to control a flight parameter and detect whether the first cell unit 11021 and the second cell unit 11023 fail.

In some embodiments, the main processor 1103 can be configured to direct the first cell unit 11021 to terminate powering or charging if the first cell unit 11021 fails and direct the second cell unit 11023 to terminate powering or charging if the second cell unit 11023 fails.

In some embodiments of the disclosure, the main processor 1103 can detect whether a current of the first cell unit 11021 exceeds a first current threshold. A determination that the first cell unit 11021 fails can be made if the current of the first cell unit 11021 exceeds the first current threshold.

In some embodiments of the disclosure, the main processor 1103 can be configured to detect whether a voltage of at least one cell in the first cell unit 11021 exceeds a first voltage threshold. A determination that the first cell unit 11021 fails can be made if the voltage of the at least one cell in the first cell unit 11021 exceeds the first voltage threshold.

In some embodiments of the disclosure, the main processor 1103 can be configured to detect whether a voltage of at least one cell in the first cell unit 11021 is below a second voltage threshold. A determination that the first cell unit 11021 fails can be made if the voltage of the at least one cell in the first cell unit 11021 is below the second voltage threshold.

In some embodiments of the disclosure, the main processor 1103 can be configured to detect whether a temperature of at least one cell in the first cell unit 11021 is within a first preset temperature range. A determination that the first cell unit 11021 fails can be made if the temperature of the at least one cell in the first cell unit 11021 is outside the first preset temperature range.

In some embodiments of the disclosure, as shown in FIG. 11, the unmanned aerial vehicle 110 further comprise an alarm device 1104. The main processor 1103 can be in communication connection with the alarm device 1104. The alarm device 1104 can generate an alarm if the first cell unit 11021 and/or the second cell unit 11023 fails.

In some embodiments of the disclosure, the alarm device 1104 can comprise a loudspeaker providing an audible alarm if the first cell unit 11021 and/or the second cell unit 11023 fails.

In some embodiments of the disclosure, the alarm device 1104 can comprise an indicator lamp providing a visual alarm if the first cell unit 11021 and/or the second cell unit 11023 fails.

In some embodiments of the disclosure, the main processor 1103 can be configured to enter into a power shortage mode upon detecting a failure in the first cell unit 11021 or the second cell unit 11023.

In some embodiments of the disclosure, the power shortage mode can comprise at least one of reducing an output power of the propulsion device 1101, directing the unmanned aerial vehicle 110 to perform an automatic return flight, or directing the unmanned aerial vehicle 110 to perform a direct landing.

In some embodiments of the disclosure, the main processor 1103 can be configured to reduce an output power of the propulsion device 1101 upon detecting a failure in the first cell unit 11021 or the second cell unit 11023.

In some embodiments of the disclosure, the main processor 1103 can be configured to direct the unmanned aerial vehicle 110 to perform an automatic return flight upon detecting a failure in the first cell unit 11021 or the second cell unit 11023.

In some embodiments of the disclosure, the main processor 1103 can be configured to direct the unmanned aerial vehicle 110 to perform a direct landing upon detecting a failure in the first cell unit 11021 or the second cell unit 11023.

The embodiment shown in FIG. 11 and other embodiments can be combined with one another provided they are technically compatible. A detailed description thereof is omitted.

Figure 12:
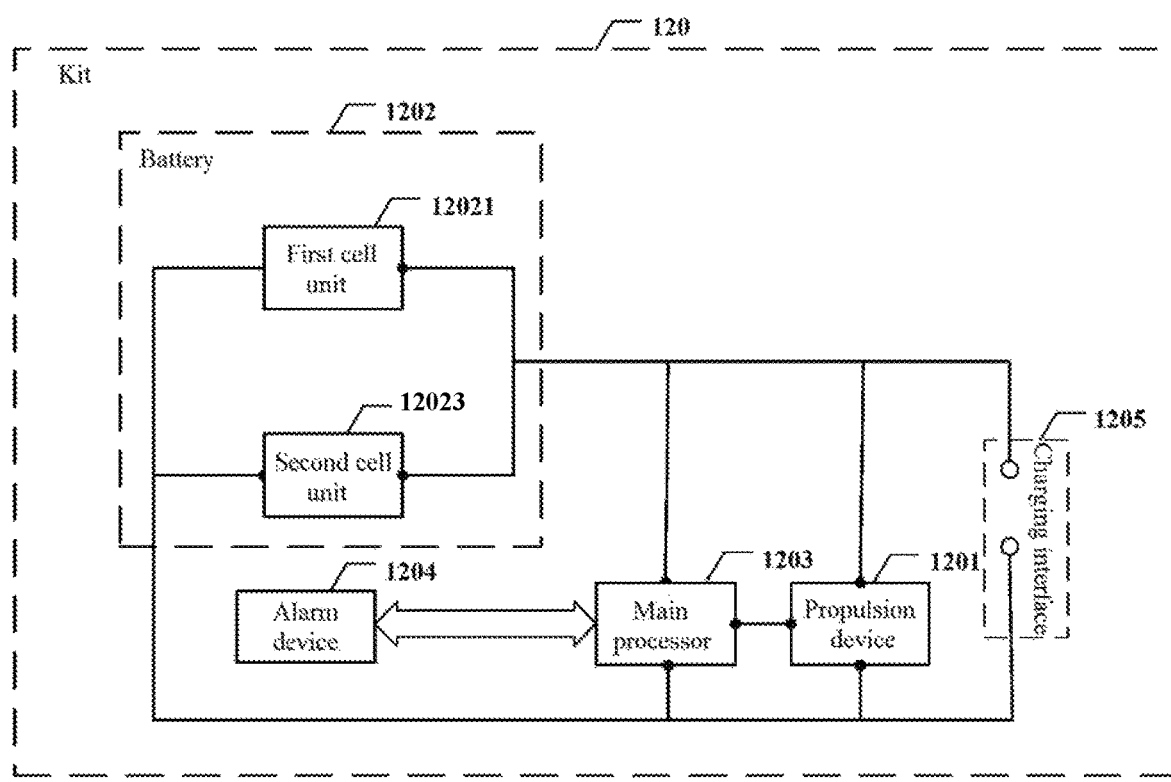
FIG. 12 is another schematic diagram of a kit for assembling a UAV in accordance with an embodiment of the disclosure.

FIG. 12 shows another example kit 120 for assembling an unmanned aerial vehicle in accordance with embodiments of the disclosure. The kit 120 comprises a propulsion device 1201, a battery 1202, and a main processor 1203.

The propulsion device 1201 can be configured to provide a propulsion, e.g., for flight. The battery 1202 can provide an electric energy to the propulsion device 1201. In some embodiments, as shown in FIG. 12, the battery 1202 comprises a first cell unit 12021 and a second cell unit 12023 which are connected in parallel. Each of the first cell unit 12021 and the second cell unit 12023 can comprise at least one cell.

The main processor 1203 can be configured to control a flight parameter and detect whether the first cell unit 12021 and the second cell unit 12023 fail.

The main processor 1203 can be electrically connected with the propulsion device 1201 and the battery 1202 upon assembling the kit 1200. In some embodiments, the main processor 1203 can be configured to direct the first cell unit 12021 to terminate powering or charging if the first cell unit 12021 fails and direct the second cell unit 12023 to terminate powering or charging if the second cell unit 12023 fails.

In some embodiments of the disclosure, the main processor 1203 can detect whether a current of the first cell unit 12021 exceeds a first current threshold. A determination that the first cell unit 12021 fails can be made if the current of the first cell unit 12021 exceeds the first current threshold.

In some embodiments of the disclosure, the main processor 1203 can detect whether a current of the second cell unit 12023 exceeds a second current threshold. A determination that the second cell unit 12023 fails can be made if the current of the second cell unit 12023 exceeds the second current threshold.

In some embodiments of the disclosure, the main processor 1203 can be configured to detect whether a voltage of at least one cell in the first cell unit 12021 exceeds a first voltage threshold. A determination that the first cell unit 12021 fails can be made if the voltage of the at least one cell in the first cell unit 12021 exceeds the first voltage threshold.

In some embodiments of the disclosure, the main processor 1203 can be configured to detect whether a voltage of at least one cell in the second cell unit 12023 exceeds a third voltage threshold. A determination that the second cell unit 12023 fails can be made if the voltage of the at least one cell in the second cell unit 12023 exceeds the third voltage threshold.

In some embodiments of the disclosure, the main processor 1203 can be configured to detect whether a voltage of at least one cell in the first cell unit 12021 is below a second voltage threshold. A determination that the first cell unit 12021 fails can be made if the voltage of the at least one cell in the first cell unit 12021 is below the second voltage threshold.

In some embodiments of the disclosure, the main processor 1203 can be configured to detect whether a voltage of at least one cell in the second cell unit 12023 is below a fourth voltage threshold. A determination that the second cell unit 12023 fails can be made if the voltage of the at least one cell in the second cell unit 12023 is below the fourth voltage threshold.

In some embodiments of the disclosure, the main processor 1203 can be configured to detect whether a temperature of at least one cell in the first cell unit 12021 is within a first preset temperature range. A determination that the first cell unit 12021 fails can be made if the temperature of the at least one cell in the first cell unit 12021 is outside the first preset temperature range.

In some embodiments of the disclosure, the main processor 1203 can be configured to detect whether a temperature of at least one cell in the second cell unit 12023 is within a second preset temperature range. A determination that the second cell unit 12023 fails can be made if the temperature of the at least one cell in the second cell unit 12023 is outside the second preset temperature range.

In some embodiments of the disclosure, as shown in FIG. 12, the kit 120 further comprises an alarm device 1204. The alarm device 1204 can generate an alarm if the first cell unit 12021 and/or the second cell unit 12023 fails.

In some embodiments, the main processor 1203 can be in communication connection with the alarm device 1204 once the kit 120 is assembled.

In some embodiments of the disclosure, the alarm device 1204 can comprise a loudspeaker providing an audible alarm if the first cell unit 12021 and/or the second cell unit 12023 fails.

In some embodiments of the disclosure, the alarm device 1204 can comprise an indicator lamp providing a visual alarm if the first cell unit 12021 and/or the second cell unit 12023 fails.

In some embodiments of the disclosure, the main processor 1203 can be configured to enter into a power shortage mode upon detecting a failure in the first cell unit 12021 or the second cell unit 12023.

In some embodiments of the disclosure, the main processor 1203 can be configured to reduce an output power of the propulsion device 1201 upon detecting a failure in the first cell unit 12021 or the second cell unit 12023.

In some embodiments of the disclosure, the main processor 1203 can be configured to direct the unmanned aerial vehicle to perform an automatic return flight upon detecting a failure in the first cell unit 12021 or the second cell unit 12023.

In some embodiments of the disclosure, the main processor 1203 can be configured to direct the unmanned aerial vehicle to perform a direct landing upon detecting a failure in the first cell unit 12021 or the second cell unit 12023.

The embodiment shown in FIG. 12 and other embodiments can be combined with one another provided they are technically compatible. A detailed description thereof is omitted.

Figure 13:
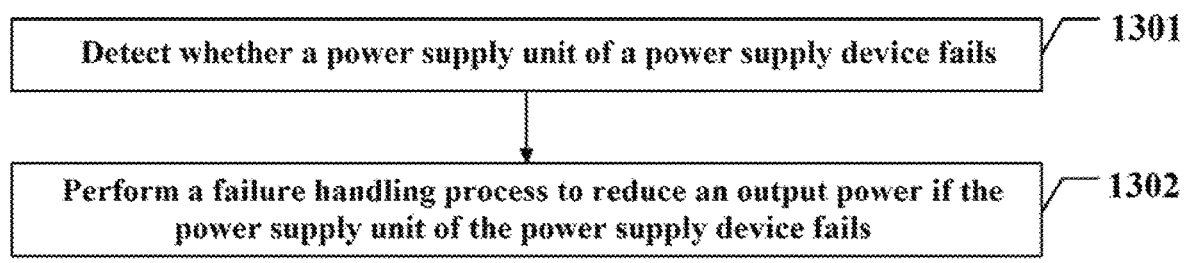
FIG. 13 is a flowchart of a fault handling method of a UAV in accordance with an embodiment of the disclosure.

FIG. 13 shows a flow chart of another example flight control method of an unmanned aerial vehicle in accordance with embodiments of the disclosure. As shown in FIG. 13, at 1301, a main processor detects whether a power supply unit of a power supply device fails. Process 1302 can be performed if the power supply unit of the power supply device fails.

In some embodiments, the unmanned aerial vehicle can comprise the main processor, a propulsion device, and the power supply device. The power supply device can provide power to the propulsion device. The power supply device can comprise a plurality of power supply units that provide a power in parallel. Process 1302 can be performed if the main processor of the unmanned aerial vehicle detects that the power supply unit of the power supply device fails. The process stays at 1301 if the main processor detects that no power supply unit of the power supply device fails.

At 1302, a failure handling process is performed to reduce an output power if the power supply unit of the power supply device fails.

In some embodiments, the main processor can perform the failure handling process if the power supply unit of the power supply device fails, and the propulsion device can reduce the output power based upon the failure handling process.

In some embodiments of the disclosure, the process of the main processor detecting whether the power supply unit of the power supply device fails can comprise the main processor of the unmanned aerial vehicle determining the power supply device fails if the main processor receiving a failure signal from the power supply device.

In some embodiments of the disclosure, the process of the main processor detecting whether the power supply unit of the power supply device fails can be effected by the main processor detecting whether a communication connection between the main processor and a control circuit corresponding to at least one power supply unit of the power supply device is disconnected, and determining the power supply device fails if the communication connection is disconnected.

In some embodiments, each of the power supply units can be provided with one control circuit. A disconnection in the communication connection between the control circuit and the main processor can indicate a failure in the power supply unit. Therefore, a determination that the power supply device fails can be made.

In some embodiments of the disclosure, the process of the main processor detecting whether the power supply unit of the power supply device fails can be effected by the main processor detecting whether a variation in an electric parameter outputted from the power supply device exceeds a preset threshold, and determining the power supply device fails if the variation exceeds the preset threshold.

In some embodiments of the disclosure, the failure handling process can comprise a return flight process. The main processor performing a failure handling process can be effected by the main processor performing the return flight process.

In some embodiments, the main processor can perform the return flight process if the power supply unit of the power supply device fails.

In some embodiments of the disclosure, the failure handling process can comprise a direct landing process. The main processor performing a failure handling process can be effected by the main processor performing the direct landing process.

In some embodiments, the main processor can perform the direct landing process if the power supply unit of the power supply device fails.

In some embodiments of the disclosure, the power supply device can be a battery, and the power supply unit can be a cell unit.

In some embodiments, the process of detecting whether the battery fails can be similar to the embodiment shown in FIG. 5. A detailed description thereof is omitted.

In some embodiments of the disclosure, the power supply device can comprise various types of batteries, and the power supply unit can be a battery.

In some embodiments, the power supply device can comprise a plurality of batteries of different types, and the power supply unit can be a battery. The plurality of batteries in the power supply device can be of same type or of different types.

Figure 14:
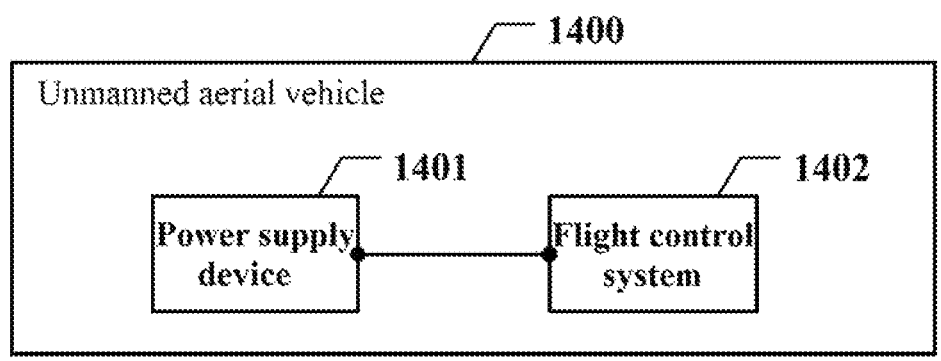
FIG. 14 is a schematic diagram of a UAV in accordance with an embodiment of the disclosure.

FIG. 14 shows an example unmanned aerial vehicle 1400 in accordance with embodiments of the disclosure. The unmanned aerial vehicle 1400 comprises a power supply device 1401 and a flight control system 1402.

The power supply device 1401 can comprise at least two power supply units which are connected with each other in parallel. Each of the power supply units can be electrically connected with one control circuit to power the flight control system 1402.

The flight control system 1402 can be configure to detect whether the at least two power supply units of the power supply device fail, and perform a failure handling process to reduce an output power based upon the failure handling process if the at least two power supply units of the power supply device fail.

In some embodiments of the disclosure, the flight control system 1402 can determine the power supply device 1401 fails if receiving a failure signal from the power supply device 1401.

In some embodiments of the disclosure, the flight control system 1402 can detect whether a communication connection between the flight control system and the control circuit corresponding to at least one power supply unit of the power supply device 1401 is disconnected, and determine the power supply device 1401 fails if the communication connection is disconnected.

In some embodiments of the disclosure, the flight control system 1402 can detect whether a variation in an electric parameter outputted from the power supply device 1401 exceeds a preset threshold, and determine the power supply device 1401 fails if the variation exceeds the preset threshold.

In some embodiments of the disclosure, the flight control system 1402 can perform a return flight process if the power supply device 1401 fails.

In some embodiments of the disclosure, the flight control system 1402 can perform a direct landing process if the power supply device 1401 fails.

In some embodiments of the disclosure, the power supply device 1401 can be a battery, and the power supply unit can be a cell unit.

Consistent with the disclosure, a failure of the first cell unit and/or the second cell unit can be detected. The first cell unit can be directed to terminate discharging or charging if the first cell unit fails. The second cell unit can be directed to terminate discharging or charging if the second cell unit fails. The first cell unit and the second cell unit can each be a battery. If any cell unit in the battery fails, a control circuit corresponding to the failed cell unit can disconnect an electrical connection between the failed cell unit and an external device. Therefore, a safety of the failed cell unit can be assured. Meanwhile, a cell unit that does not fail can continue a normal operation, and thus a normal operation of the unmanned aerial vehicle can be performed while a safety of the battery is assured. As compared with the conventional technologies, the technical solutions of present disclosure can improve a safety of the unmanned aerial vehicle without adversely affecting a payload capacity of the unmanned aerial vehicle.

The terms "or/as well as" and "and/or" used in the specification, the claims, and the foregoing figures of the disclosure have the same meaning. The terms "first," "second," and the like in the specification, the claims, and the foregoing figures of the disclosure are used to distinguishing similar objects, rather than describing a specific sequence or precedence order. It will be understood terms used therefore may interchange where appropriate, so that the embodiments described herein can be implemented in other order than the content depicted or described herein. In addition, the terms "comprises," "includes," "has," and their variants are intended to cover non-exclusive inclusion, for example, processes, methods, systems, products, or devices including a series of steps or modules are not limited to those steps or modules enumerated, but may include other steps or modules that are not enumerated or that are intrinsic to these processes, methods, products or devices. The division of modules as mentioned in this disclosure is merely logical division, and in real application there may exist further division methods, for example, multiple modules may be combined into or integrated on another system. Some features may be ignored or be not performed. In addition, the mutual coupling or direct coupling or communication connection as displayed or discussed may be indirect coupling between modules through some interfaces, or communication connection may take an electrical or other similar form. This is not limited in this disclosure. Moreover, modules or sub-modules illustrated as separate components may be physically separate, may be physical modules, or may not be distributed among multiple circuit modules. The objectives of the embodiments of the disclosure may be accomplished by selecting part of or all modules according to actual needs.

The foregoing disclosure is merely illustrative of the embodiments of the disclosure but not intended to limit the scope of the disclosure. Any equivalent modifications to a structure or process flow, which are made without departing from the specification and the drawings of the disclosure, and a direct or indirect application in other relevant technical fields, shall also fall into the scope of the disclosure.

What is claimed is:

1. A battery comprising:
    a first cell unit;
    a first control circuit electrically connected with the first cell unit, the first control circuit being configured to disconnect an electrical connection between the first cell unit and a power output terminal of the first control circuit in response to a failure of the first cell unit;
    a second cell unit connected with the first cell unit in parallel; and
    a second control circuit electrically connected with the second cell unit, the second control circuit being configured to disconnect an electrical connection between the second cell unit and a power output terminal of the second control circuit in response to a failure of the second cell unit;
    wherein:
        the first control circuit is in communication with the second control circuit;
        in response to a failure of the second control circuit, the first control circuit is configured to output a first signal indicating the failure in the second control circuit; and
        in response to a failure of the first control circuit, the second control circuit is configured to output a second signal indicating the failure in the first control circuit.

2. The battery of claim 1, wherein the first control circuit further comprises a signal output terminal configured to, in response to the failure of the first cell unit:
    transmits a third signal indicating a failure in the first cell unit, or
    terminate a communication transmission of the signal output terminal.

3. The battery of claim 1, wherein:
    the first control circuit is further configured to transmit a fourth signal indicating a failure in the second cell unit in response to the failure of the second cell unit, and
    the second control circuit is further configured to transmit a fifth signal indicating a failure in the first cell unit in response to the failure of the first cell unit.

4. The battery of claim 1, wherein:
    the first control circuit comprises a monitoring circuit and a metal-oxide-semiconductor (MOS) transistor,
    the monitoring circuit is configured to output a control signal to the MOS transistor in response to a failure of the first cell unit, and
    the MOS transistor is configured to disconnect an electrical connection between the first cell unit and the power output terminal of the first control circuit based upon the control signal.

5. The battery of claim 1, wherein the first control circuit is further configured to determine that the first cell unit fails in response to:
    detecting that a current of the first cell unit exceeds a current threshold, or
    detecting that a voltage of at least one cell of the first cell unit exceeds a first voltage threshold, or
    detecting that a voltage of at least one cell of the first cell unit is below a second voltage threshold, or
    detecting that a temperature of at least one cell of the first cell unit is outside a preset temperature range.

6. The battery of claim 1, further comprising:
    an alarm device in communication connection with the first control circuit and the second control circuit, the alarm device being configured to generate an alarm in response to the failure of the first cell unit or the second cell unit.

7. The battery of claim 6, wherein:
    the first control circuit is further configured to direct the alarm device to generate the alarm in response to the failure of the first cell unit, and
    the second control circuit is further configured to direct the alarm device to generate the alarm in response to the failure of the second cell unit.

8. The battery of claim 6,
    wherein the first control circuit and the second control circuit are configured to communicate with each other, and
    wherein:
        the first control circuit is configured to direct the alarm device to generate the alarm in response to the failure of the second cell unit, and
        the second control circuit is configured to direct the alarm device to generate the alarm in response to the failure of the first cell unit.

9. The battery of claim 6, wherein the alarm device comprises at least one of:
    a loudspeaker configured to generate an audible alarm in response to the failure of the first cell unit and/or the failure of the second cell unit, or
    an indicator lamp configured to generate a visual alarm in response to the failure of the first cell unit and/or the failure of the second cell unit.

10. A method for managing a battery comprising a first cell unit and a second cell unit connected in parallel, the method comprising:
    detecting whether the first cell unit using a first control circuit;
    detecting whether the second cell unit fails using a second control circuit;

directing the first cell unit to terminate discharging or charging in response to a failure of the first cell unit;
directing the second cell unit to terminate discharging or charging in response to a failure of the second cell unit;
establishing a communication between the first control circuit and the second control circuit;
in response to a failure of the second control circuit, outputting a first signal by the first control circuit indicating the failure in the second control circuit; and
in response to a failure of the first control circuit, outputting a second signal by the second control circuit indicating the failure in the first control circuit.

11. The method of claim 10, further comprising:
transmitting a third signal by the first control circuit indicating the failure in the first cell unit in response to the failure of the first cell unit fails; and
transmitting a fourth signal by the second control circuit indicating the failure in the second cell unit in response to the failure of the second cell unit.

12. The method of claim 10, wherein:
directing the first cell unit to terminate discharging or charging comprises directing the first cell unit to terminate discharging or charging using the first control circuit in response to the failure of the first cell unit, and
directing the second cell unit to terminate discharging or charging comprises directing the second cell unit to terminate discharging or charging using the second control circuit in response to the failure of the second cell unit.

13. The method of claim 12, further comprising:
disconnecting a communication connection between the first control circuit and an external device in response to the failure of the first cell unit; and
disconnecting a communication connection between the second control circuit and the external device in response to the failure of the second cell unit.

14. The method of claim 12, wherein:
directing the first cell unit to terminate discharging or charging comprises transmitting a fifth signal indicating the failure of the first cell unit to an external device using the second control circuit in response to the failure of the first cell unit, and
directing the second cell unit to terminate discharging or charging comprises transmitting a sixth signal indicating the failure of the second cell unit to the external device using the first control circuit in response to the failure of the second cell unit.

15. The method of claim 10, wherein detecting whether the first cell unit or the second cell unit fails comprises determining that the first cell unit fails in response to:
detecting that a current of the first cell unit exceeds a current threshold, or
detecting that a voltage of at least one cell of the first cell unit exceeds a first voltage threshold, or
detecting that a voltage of at least one cell of the first cell unit is below a second voltage threshold, or
detecting that a temperature of at least one cell of the first cell unit is outside a preset temperature range.

16. The method of claim 10, further comprising:
generating an alarm in response to the failure of the first cell unit and/or the failure of the second cell unit.

17. The method of claim 16, wherein generating the alarm comprises at least one of:
generating an audible alarm, or
generating a visual alarm.

18. An unmanned aerial vehicle comprising:
a propulsion device configured to provide a propulsion; and
a battery configured to provide an electric power to the propulsion device, the battery comprising:
a first cell unit;
a first control circuit electrically connected with the first cell unit, the first control circuit being configured to disconnect an electrical connection between the first cell unit and a power output terminal of the first control circuit in response to a failure of the first cell unit;
a second cell unit connected with the first cell unit in parallel; and
a second control circuit electrically connected with the second cell unit, the second control circuit being configured to disconnect an electrical connection between the second cell unit and a power output terminal of the second control circuit in response to a failure of the second cell unit;
wherein:
the first control circuit is in communication with the second control circuit;
in response to a failure of the second control circuit, the first control circuit is configured to output a first signal indicating the failure in the second control circuit; and
in response to a failure of the first control circuit, the second control circuit is configured to output a second signal indicating the failure in the first control circuit.

\* \* \* \* \*